United States Patent
Du et al.

(10) Patent No.: US 12,058,979 B2
(45) Date of Patent: Aug. 13, 2024

(54) SYSTEM AND METHOD FOR ANIMAL DETECTION

(71) Applicant: PING AN TECHNOLOGY (SHENZHEN) CO., LTD., Shenzhen (CN)

(72) Inventors: Chen Du, Sunnyvale, CA (US); Juihsin Lai, Santa Clara, CA (US); Mei Han, Palo Alto, CA (US)

(73) Assignee: PING AN TECHNOLOGY (SHENZHEN) CO., LTD, Shenzhen (CN)

( * ) Notice: Subject to any disclaimer, the term of this patent is extended or adjusted under 35 U.S.C. 154(b) by 538 days.

(21) Appl. No.: 17/361,258

(22) Filed: Jun. 28, 2021

(65) Prior Publication Data
US 2022/0408698 A1 Dec. 29, 2022

(51) Int. Cl.
| | |
|---|---|
| *A01K 29/00* | (2006.01) |
| *G06F 18/2321* | (2023.01) |
| *G06N 3/08* | (2023.01) |
| *G06V 10/25* | (2022.01) |
| *G06V 40/10* | (2022.01) |
| *G06V 40/20* | (2022.01) |

(52) U.S. Cl.
CPC ........ *A01K 29/005* (2013.01); *G06F 18/2321* (2023.01); *G06N 3/08* (2013.01); *G06V 10/25* (2022.01); *G06V 40/10* (2022.01); *G06V 40/20* (2022.01)

(58) Field of Classification Search
CPC .... A01K 29/005; G06F 18/2321; G06N 3/08; G06N 5/02; G06N 3/048; G06N 3/09; G06N 3/0464; G06V 10/25; G06V 40/10; G06V 40/20; G06V 10/454; G06V 10/757; G06V 10/762; G06V 10/82; G06V 10/84; G06V 20/17; G06V 20/52; G06V 40/103
See application file for complete search history.

(56) References Cited

U.S. PATENT DOCUMENTS 11,602,132 B2 * 3/2023 Spears ................ G06V 20/41
2020/0410669 A1 * 12/2020 Psota .................. G06T 7/0012

OTHER PUBLICATIONS

T. Psota E, Schmidt T, Mote B, C. Pérez L. Long-term tracking of group-housed livestock using keypoint detection and map estimation for individual animal identification. Sensors. Jun. 30, 2020;20(13):3670. (Year: 2020).*

(Continued)

*Primary Examiner* — Fayyaz Alam
(74) *Attorney, Agent, or Firm* — BAYES PLLC

(57) ABSTRACT

A system and a method for detecting animals in a region of interest are disclosed. An image that captures a scene in the region of interest is received. The image is fed to an animal detection model to produce a group of probability maps for a group of key points and a group of affinity field maps for a group of key point sets. One or more connection graphs are determined based on the group of probability maps and the group of affinity field maps. Each connection graph outlines a presence of an animal in the image. One or more animals present in the region of interest are detected based on the one or more connection graphs.

20 Claims, 17 Drawing Sheets

(56) References Cited

OTHER PUBLICATIONS

Li X, Zhao L, Wei L, Yang MH, Wu F, Zhuang Y, Ling H, Wang J. Deepsaliency: Multi-task deep neural network model for salient object detection. IEEE transactions on image processing. Jun. 9, 2016;25(8):3919-30. (Year: 2016).*

Gopalakrishnan V, Hu Y, Rajan D. Random walks on graphs for salient object detection in images. IEEE Transactions on Image processing. Jun. 28, 2010;19(12):3232-42. (Year: 2010).*

* cited by examiner

Table 1: Parameters for Convolutional Sequence

| Input | Operator | t | c | n | s |
|---|---|---|---|---|---|
| $112^2 \times 32$ | bottleneck | 1 | 16 | 2 | 1 |
| $112^2 \times 16$ | bottleneck | 6 | 32 | 2 | 2 |
| $56^2 \times 32$ | bottleneck | 6 | 64 | 2 | 1 |
| $56^2 \times 64$ | bottleneck | 6 | 128 | 2 | 1 |

SYSTEM AND METHOD FOR ANIMAL DETECTION

TECHNICAL FIELD

The present disclosure relates to animal detection, and more particularly, to a system and method for detecting animals in a region of interest.

BACKGROUND

An increasing demand on meat consumption has promoted a continuous growth of a livestock breeding industry. In a breeding factory, there may be hundreds of or thousands of animals being raised simultaneously in different pens. For example, a pig breeding factory may have dozens or hundreds of pig pens, with each pig pen having dozens of pigs living together. If the pigs raised in the pig breeding factory are counted manually, a considerable amount of human labor may be needed to calculate a total number of pigs raised in the breeding factory. Meanwhile, if some of the pigs have run into the wrong pens from time to time, it may make the manual calculation of the pigs more difficult. Thus, an operation cost of the breeding factory may increase due to an increasing labor cost in the factory.

SUMMARY

In one aspect, a method for detecting animals in a region of interest is disclosed. An image that captures a scene in the region of interest is received. The image is fed to an animal detection model to produce a group of probability maps for a group of key points and a group of affinity field maps for a group of key point sets. One or more connection graphs are determined based on the group of probability maps and the group of affinity field maps. Each connection graph outlines a presence of an animal in the image. One or more animals present in the region of interest are detected based on the one or more connection graphs.

In another aspect, a system for detecting animals in a region of interest is disclosed. The system includes a memory and a processor. The memory is configured to store instructions. The processor is coupled to the memory and configured to execute the instructions to perform a process including: receiving an image that captures a scene in the region of interest; feeding the image to an animal detection model to produce a group of probability maps for a group of key points and a group of affinity field maps for a group of key point sets; determining one or more connection graphs based on the group of probability maps and the group of affinity field maps, where each connection graph outlines a presence of an animal in the image; and detecting one or more animals present in the region of interest based on the one or more connection graphs.

In yet another aspect, a non-transitory computer-readable storage medium is disclosed. The computer-readable storage medium is configured to store instructions which, in response to an execution by a processor, cause the processor to perform a process including: receiving an image that captures a scene in the region of interest; feeding the image to an animal detection model to produce a group of probability maps for a group of key points and a group of affinity field maps for a group of key point sets; determining one or more connection graphs based on the group of probability maps and the group of affinity field maps, where each connection graph outlines a presence of an animal in the image; and detecting one or more animals present in the region of interest based on the one or more connection graphs.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated herein and form a part of the specification, illustrate implementations of the present disclosure and, together with the description, further serve to explain the present disclosure and to enable a person skilled in the pertinent art to make and use the present disclosure.

Figure 1A:
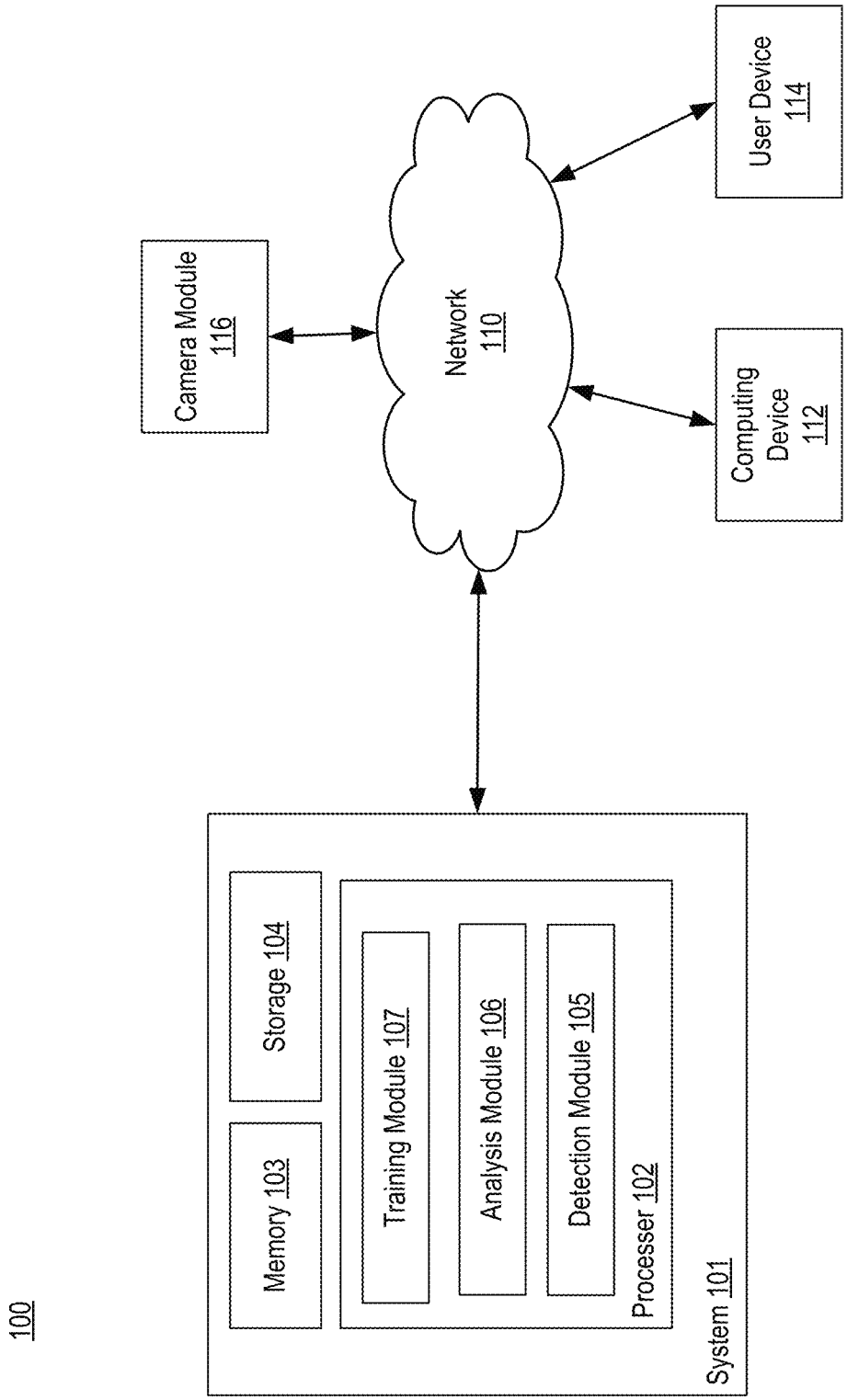
FIG. 1A illustrates a block diagram of an exemplary operating environment for a system configured to detect animals in a region of interest, according to embodiments of the disclosure.

Implementations of the present disclosure will be described with reference to the accompanying drawings.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Computer vision technology can be applied in animal breeding industries to monitor animals raised in breeding factories. For example, cameras can be installed in a breeding factory to monitor animals raised in different pens. Images or videos taken by the cameras can be processed to detect the animals in the different pens and calculate a total number of animals in the breeding factory automatically. As a result, labor cost in the breeding factory can be reduced.

Generally, animals raised in a breeding factory may have a variety of living habits, such as standing up together in a crowd, laying down on a floor back-to-back, resting together in a corner with one animal overlapping with another, or crowding together along a food tank to eat food, etc. As a result, one or more parts of an animal can be easily blocked from sight of view by another animal. Thus, difficulty in the detection of the animals from an image (or a video frame) can be increased.

In some examples, a single-stage network model (e.g., You Only Look Once (YOLO), RetinaNet) can be used to detect objects in an image using a non-maximum suppression algorithm. This single-stage network model may be used to detect animals in a pen of a breeding factory. However, since the animals (e.g., pigs) in the pen may have a habit of gathering closely to rest or crowding together to eat food, an image that captures a scene of the pen may depict that the animals are stacked up together or overlapped with one another. When the non-maximum suppression algorithm is applied to detect the animals from the image, multiple animals that overlap with one another may be identified as a single animal, leading to a miss detection of the animals in the pen. As a result, the single-stage network model may fail to detect the animals in the pen, especially when the animals are crowded together.

In some examples, a two-stage network model (e.g., Faster-RCNN, Mask-RCNN) can be used to detect objects in images. However, due to a structural complexity of the two-stage network model, a detection speed of the model is slow. The two-stage network model cannot be used to detect objects in real time or near real time. Thus, when the two-stage network model is applied to detect animals in a pen, a significant detection delay can be incurred.

In some examples, a pose detection model based on key point determination can be used to detect poses of objects in an image. When the pose detection model is applied to detect animals in a pen, a regression method based on a coordinate-difference prediction can be used to establish a relationship between key points so that the key points can be matched to different animals. In a case where the animals are crowded together in the pen, the regression method may mismatch the key points, leading to a failure in the detection of the animal poses. As a result, the pose detection model may also fail to detect the animals in the pen, especially when the animals are crowded together.

In the present disclosure, an animal detection system and method are provided, which can detect animals in a region of interest even if the animals are crowded together in the region of interest. Specifically, a camera module can be used to acquire an image that captures a scene in the region of interest. By applying an animal detection model, the animal detection system and method described herein may determine one or more connection graphs of one or more animals that appear in the image. Each connection graph may outline a presence of an animal in the image. The animal detection system and method may detect the one or more animals present in the region of interest based on the one or more connection graphs.

For example, the image can be fed into the animal detection model to generate a group of probability maps for a group of key points and a group of affinity field maps for a group of key point sets. The one or more connection graphs can be determined based on the group of probability maps and the group of affinity field maps. Then, the one or more connection graphs can be used to determine a detection result including, but not limited to, a total number of animals present in the region of interest, one or more geographical positions of the one or more animals in the region of interest, and one or more postures of the one or more animals.

The animal detection system and method described herein can provide the detection result for the region of interest in real time or near real time with a high accuracy. Both a likelihood that one or more of the animals may be missed in the detection result (e.g., a likelihood of miss detection) and a likelihood that one or more of the animals may be detected incorrectly (e.g., a likelihood that one or more of the animals are mismatched) can be reduced.

For example, the animal detection system and method described herein may redefine a group of key points for each animal. By using the group of key points, the likelihood of miss detection can be reduced even if the animals gather together closely. Also, a likelihood of mismatch between the key points of different animals can also be reduced.

In another example, the animal detection system and method described herein apply an affinity field of a key point set to measure different degrees of association between different locations of key points in the key point set, and match the different locations of key points to different animals based on the degrees of association. This matching approach is more stable than the regression method based on the coordinate-difference prediction and can greatly reduce mismatches of the key points.

In yet another example, the animal detection model described herein can include a feature extraction model. The feature extraction model can reduce the number of parameters used in a neural network of the model and meanwhile guarantee a high accuracy in the detection result. For example, an accuracy of 95.4% can be achieved in the detection result while the animal detection model only has a size of 11 MB.

In still yet another example, the animal detection model described herein can be trained using a plurality of training images that capture animals with a plurality of body shapes and postures in a plurality of living environments. The plurality of training images may be captured at a plurality of times with different illuminance. Thus, diversity and robustness of the animal detection model can be improved through the training of the plurality of training images.

Consistent with the present disclosure, the term "near real time" may refer to a processing of data that quickly responds to an event with a slight delay. The slight delay can be a delay of milliseconds (ms), seconds, minutes, etc., depending on various factors such as computing capabilities, available memory space, a sampling rate of signals, etc. For example, the animal detection system and method described herein can be implemented in near real time with a delay of milliseconds.

Consistent with the present disclosure, animals described herein can be, for example, livestock raised in a breeding factory (e.g., pigs, sheep, cows, horses, chicken, geese, or ducks, etc.), animals raised in a zoo (e.g., tigers, lions, etc.), animals living in a national park, etc. By way of examples, the description hereinafter will be provided with reference to animals raised in a breeding factory. It is understood that the description can also be applied to any other types of animals.

Consistent with the present disclosure, a key point may represent a part or a joint of an animal, such as a head, a shoulder, an abdomen, a buttock, an elbow joint, a foot, etc. In some embodiments, a group of key points for an animal may include one or more body key points that lie in a body of the animal, one or more limb key points that lie in one or more limbs of the animal, or a combination thereof. For example, the one or more body key points may include a head key point, a shoulder key point, an abdomen key point, a buttock key point (or a tail key point), or a combination thereof. The one or more limb key point may include an elbow joint key point of a left front leg, a left front foot key point, an elbow joint key point of a right front leg, a right front foot key point, an elbow joint key point of a left back leg, a left back foot key point, an elbow joint key point of a right back leg, and a right back foot key point. Exemplary key points for a pig are illustrated below with reference to FIGS. 8A-8B.

Consistent with the present disclosure, a key point set may include two or more key points that form an animal segment. The animal segment may be a segment of an animal associated with the two or more key points, such as a body segment or a limb of the animal. For example, a key point set may include a head key point and a shoulder key point, and a connection between the head key point and the shoulder key point may represent a neck portion of the animal. In another example, a key point set may include a head key point, a shoulder key point, and a buttock key point. A first connection from the head key point to the shoulder key point and a second connection from the shoulder key point to the buttock key point may be combined to represent a body segment of the animal from the head to the buttock of the animal (e.g., a torso of the animal).

FIG. 1A illustrates a block diagram of an exemplary operating environment 100 for a system 101 configured to detect animals in a region of interest, according to embodiments of the disclosure. The region of interest can be, for example, an animal pen, a cage, or any other area of interest in a breeding factory. Operating environment 100 may include system 101, a computing device 112, a user device 114, a camera module 116 and any other suitable components. Components of operating environment 100 may be coupled to each other through a network 110.

In some embodiments, system 101 may be embodied on a cloud computing device. Alternatively, system 101 may be embodied on a local computing device. The computing device can be, for example, a server, a desktop computer, a laptop computer, a tablet computer, or any other suitable electronic device including a processor and a memory. In some embodiments, system 101 may include a processor 102, a memory 103, and a storage 104. It is understood that system 101 may also include any other suitable components for performing functions described herein.

For example, system 101 may have different components in a single device, such as an integrated circuit (IC) chip, or separate devices with dedicated functions. The IC may be implemented as an application-specific integrated circuit (ASIC) or a field-programmable gate array (FPGA). In another example, one or more components of system 101 may be located in a cloud computing environment, or may be alternatively in a single location or distributed locations but communicate with each other through network 110.

Figure 1B:
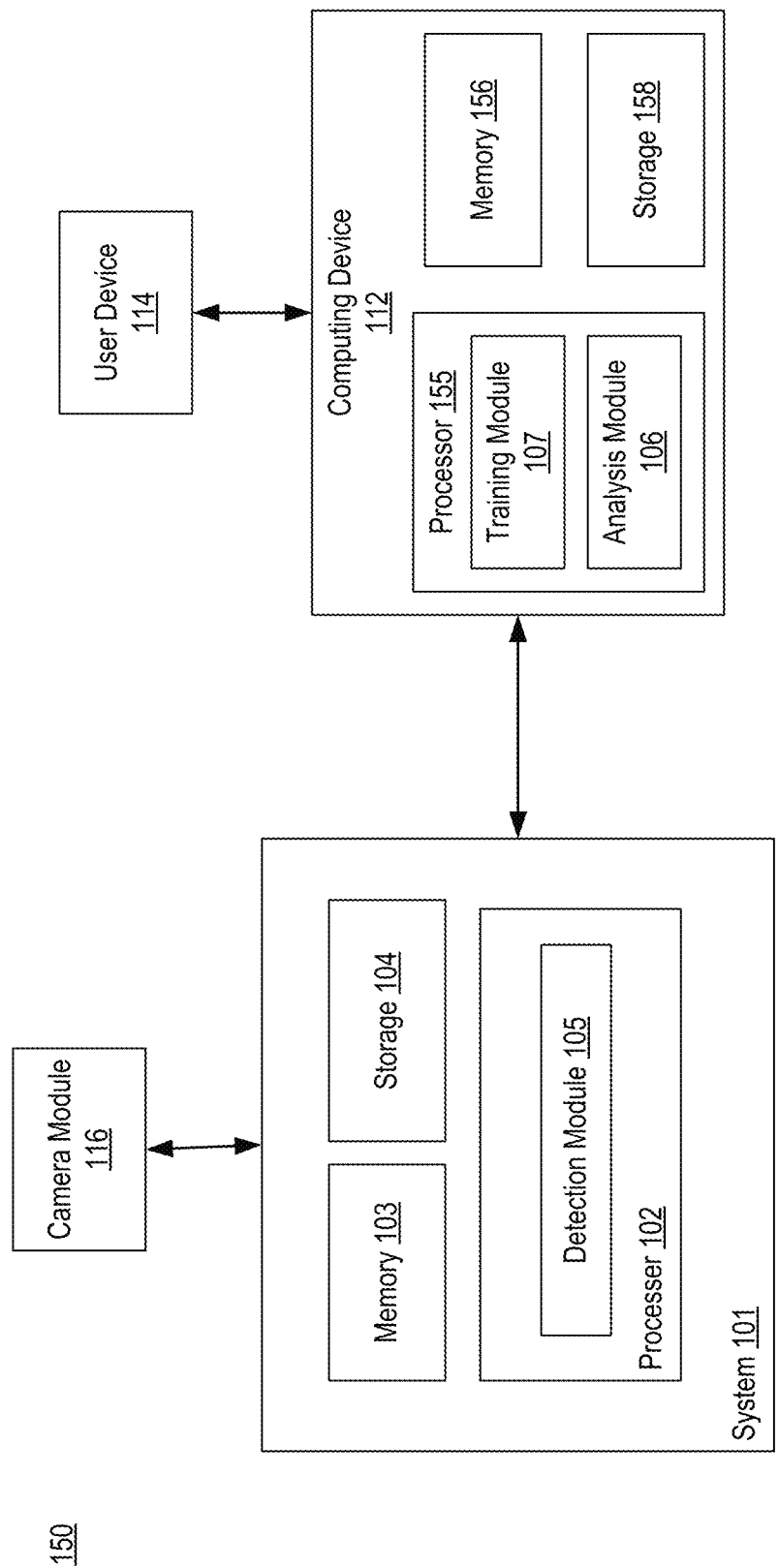
FIG. 1B illustrates a block diagram of another exemplary operating environment for a system configured to detect animals in a region of interest, according to embodiments of the disclosure.

It is understood that when system 101 is implemented in a cloud computing environment, the breeding factory may need to provide a network connection with a certain requirement (e.g., a certain bandwidth), so that camera module 116 and computing device 112 in a breeding factory can communicate with system 101 via network 110. However, system 101 can also be implemented in a local computing environment, as shown in FIG. 1B. In this case, no network connection is needed in the breeding factory, which is suitable for applications in remote areas where the network connection is not available.

Processor 102 may include any appropriate type of general-purpose or special-purpose microprocessor, digital signal processor, microcontroller, graphics processing unit (GPU). Processor 102 may include one or more hardware units (e.g., portion(s) of an integrated circuit) designed for use with other components or to execute part of a program. The program may be stored on a computer-readable medium, and when executed by processor 102, it may perform one or more functions. Processor 102 may be configured as a separate processor module dedicated to animal detection. Alternatively, processor 102 may be configured as a shared processor module for performing other functions.

Processor 102 may include several modules, such as a detection module 105, an analysis module 106 and a training module 107. Although FIG. 1A shows that detection module 105, analysis module 106 and training module 107 are within one processor 102, they may also be likely implemented on different processors located closely or remotely with each other. For example, training module 107 may be implemented by a processor (e.g., a GPU) dedicated to off-line training of an animal detection model, and detection module 105 may be implemented by another processor for detecting animals in a region of interest from an image.

Detection module 105, analysis module 106 and training module 107 (and any corresponding sub-modules or sub-units) can be hardware units (e.g., portions of an integrated circuit) of processor 102 designed for use with other components or software units implemented by processor 102 through executing at least part of a program. The program may be stored on a computer-readable medium, such as memory 103 or storage 104, and when executed by processor 102, it may perform one or more functions.

Memory 103 and storage 104 may include any appropriate type of mass storage provided to store any type of information that processor 102 may need to operate. For example, memory 103 and storage 104 may be a volatile or non-volatile, magnetic, semiconductor-based, tape-based, optical, removable, non-removable, or other type of storage device or tangible (i.e., non-transitory) computer-readable medium including, but not limited to, a ROM, a flash memory, a dynamic RAM, and a static RAM. Memory 103 and/or storage 104 may be configured to store one or more computer programs that may be executed by processor 102 to perform functions disclosed herein. For example, memory 103 and/or storage 104 may be configured to store program(s) that may be executed by processor 102 to perform animal detection. Memory 103 and/or storage 104 may be further configured to store information and data used by processor 102.

Camera module 116 may be configured to acquire an image or a video in a region of interest. For example, camera module 116 may be placed on top of an animal pen (or on a side of the animal pen) to generate an image or a video that captures a scene of the animal pen. In another example, camera module 116 may be installed on an unmanned aerial vehicle (UAV) that can fly over the animal pen. In some embodiments, camera module 116 may preprocess the image or the video. For example, camera module 116 may perform a deblurring operation, a super-resolution operation or any other suitable operation on the image or the video.

For example, camera module 116 can include an infrared camera having a lens with an ultra-wide angle. A filming area of the infrared camera can cover an entire animal pen, and the infrared camera can acquire the image or the video during daytime or nighttime. Camera module 116 can be installed above the animal pen with the lens facing down towards the animal pen. Camera module 116 may output the image or video that captures the whole animal pen. The animal pen may have a size of 6 m*5 m, and camera module 116 may be installed at 4 m above the animal pen.

In some embodiments, camera module 116 may forward the image or video to system 101, causing system 101 to detect animals in the animal pen based on the image or video. In some embodiments, camera module 116 may forward the image or video to computing device 112, causing computing device 112 to present the image or video on a screen. Although only one camera module 116 is shown in FIG. 1A, operating environment 100 may include a plurality of camera modules 116, with one camera module 116 for one animal pen in the breeding factory. In other embodiments, more than one camera module 116 can be provided for one animal pen in the breeding factory. The number of camera modules 116 for one animal pen may be the same or different, depending on different scenarios or applications (e.g., the size of the animal pen, the number of animals normally present in an animal pen, etc.)

Computing device 112 may be located in the breeding factory. For example, computing device 112 can be a sever, a desktop computer, a laptop computer, a tablet computer, or any other suitable electronic device with a processor and a memory located in the breeding factory. Computing device 112 may present the image or video acquired by camera module 116 on a display device. In some embodiments, computing device 112 may also present a message received from system 101 on the display device.

User device 114 can be a computing device including a processor and a memory. For example, user device 114 can be a desktop computer, a laptop computer, a tablet computer, a smartphone, a game controller, a television (TV) set, a music player, a wearable electronic device such as a smart watch, an Internet-of-Things (IoT) appliance, a smart vehicle, or any other suitable electronic device with a processor and a memory. User device 114 may be operated by a user (e.g., an owner, a manager, a worker, or any other personnel) related to the breeding factory. In some embodiments, user device 114 may receive a message from system 101 and present the message on a screen of user device 114. In some embodiments, user device 114 may receive an image or a video from camera module 116 and present the image or video on the screen of user device 114.

FIG. 1B illustrates a block diagram of another exemplary operating environment 150 for system 101 configured to detect animals in a region of interest, according to embodiments of the disclosure. Operating environment 150 may include system 101, computing device 112, user device 114, camera module 116, and any other suitable components.

System 101, computing device 112, and camera module 116 may be located in a breeding factory. Camera module 116 may be communicatively coupled to system 101 via a wired connection (e.g., a cable connection, a universal series bus (USB) connection) or a wireless connection (e.g., a Bluetooth connection). System 101 may be communicatively coupled to computing device 112 via a wired connection or a wireless connection. User device 114 may be communicatively coupled to computing device 112 via a wired connection or a wireless connection.

Computing device 112 may include a processor 155, a memory 156 and a storage 158. Processor 155 may include analysis module 106 and training module 107. Processor 155, memory 156 and storage 158 may have a structure similar to that of processor 102, memory 103 and storage 104, respectively, and similar description will not be repeated here.

System 101 may include processor 102, memory 103 and storage 104. Processor 102 may include detection module 105. In some embodiments, system 101 may be embodied on a system on chip (SoC). Processor 102, memory 103 and storage 104 may be implemented in an embedded integrated circuit (IC) of the SoC. In some embodiments, the SoC may be placed at a same location as camera module 116. For example, both the SoC and camera module 116 are placed together above an animal pen.

In some embodiments, the embedded IC of the SoC may include a neural network module that can implement an animal detection model described herein or any other neural network models with low power consumption. The embedded IC of the SoC may also include an input/output interface that supports an image format, a video format, or a combination thereof. For example, camera module 116 may input an image of an animal pen to the SoC via a wired or wireless connection. Detection module 105 installed in the SoC can process the image to generate a detection result and forward the detection result to computing device 112, so that the animal pen can be monitored by a user in real time or near real time through a screen of computing device 112.

Figure 2A:
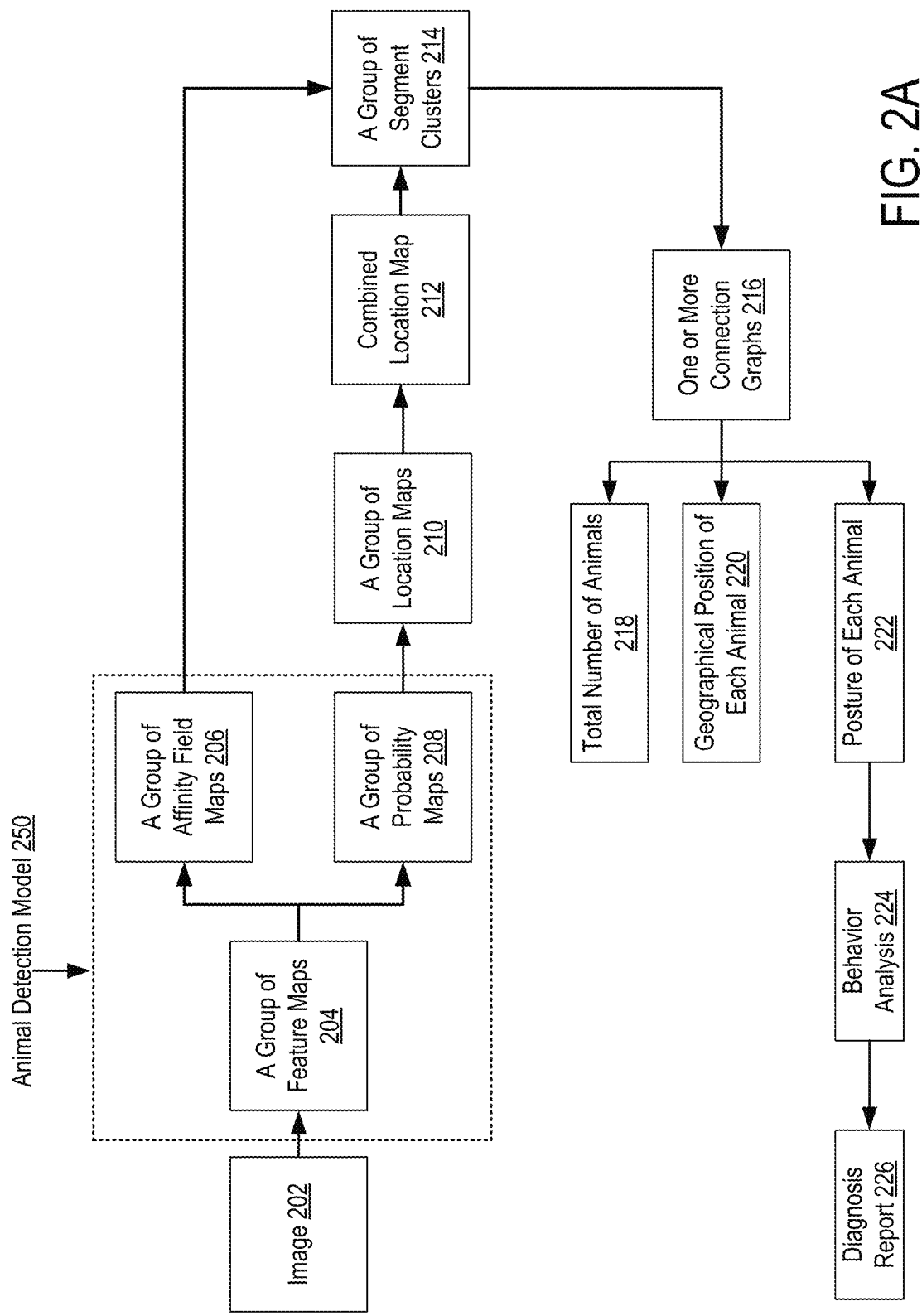
FIG. 2A illustrates an exemplary flow of operations for detecting animals in a region of interest, according to embodiments of the disclosure.

FIG. 2A illustrates an exemplary flow of operations for detecting animals in a region of interest, according to embodiments of the disclosure. The region of interest can be, for example, an animal pen in a breeding factory. In some embodiments, camera module 116 located above the animal pen or on a side of the animal pen can take an image 202 that captures a scene in the region of interest. Camera module 116 may forward image 202 to detection module 105.

Detection module 105 may be configured to feed image 202 to an animal detection model 250 to produce a group of affinity field maps 206 for a group of key point sets and a group of probability maps 208 for a group of key points. In some embodiments, the group of key points may include one or more key points, and the group of probability maps 208 may include one or more probability maps 208 corresponding to the one or more key points, respectively. The group of key point sets may include one or more key point sets, and the group of affinity field maps 206 may include one or more affinity field maps 206 corresponding to the one or more key point sets, respectively.

For example, detection module 105 may input image 202 to animal detection model 250, causing animal detection model 250 to generate a group of feature maps 204 from image 202 using a series of depthwise separable convolutional blocks. Animal detection model 250 may be configured to produce the group of probability maps 208 and the group of affinity field maps 206 from the group of feature maps 204. For example, animal detection model 250 is configured to generate a probability map 208 for each key point and an affinity field map 206 for each key point set. Each probability map 208 and each affinity field map 206 may be outputted from a different channel (or layer) of animal detection model 250. Animal detection model 250 is described below in more details with reference to FIGS. 3A-4C.

An affinity field map 206 for a key point set may depict an affinity field describing a connection trend between key points in the key point set. For example, the key point set may include a first key point and a second key point, and an animal segment (e.g., a limb or a body segment) is formed between the first key point and the second key point. Image 202 may include one or more instances of the animal segment, with each instance of the animal segment belonging to a different animal. For example, image 202 may include one or more instances of a left front leg, with each instance of the left front leg belonging to a different animal. Then, affinity field map 206 for the key point set may include one or more vector fields (e.g., two-dimensional (2D) vector fields). Each vector field may correspond to an instance of the animal segment in image 202 and encode a location and an orientation of the instance of the animal segment in image 202.

In some embodiments, for each pixel in an area belonging to an instance of the animal segment, a vector field for the instance of the animal segment may include a vector that encodes a direction pointing from the first key point to the second key point. For example, if a point lies within the area belonging to the instance of the animal segment, the vector field may include a unit vector for the point, with the unit vector pointing from the first key point to the second key point. If the point lies outside the area of the instance of the animal segment, the vector field may include a zero-valued vector for the point.

Figure 10A:
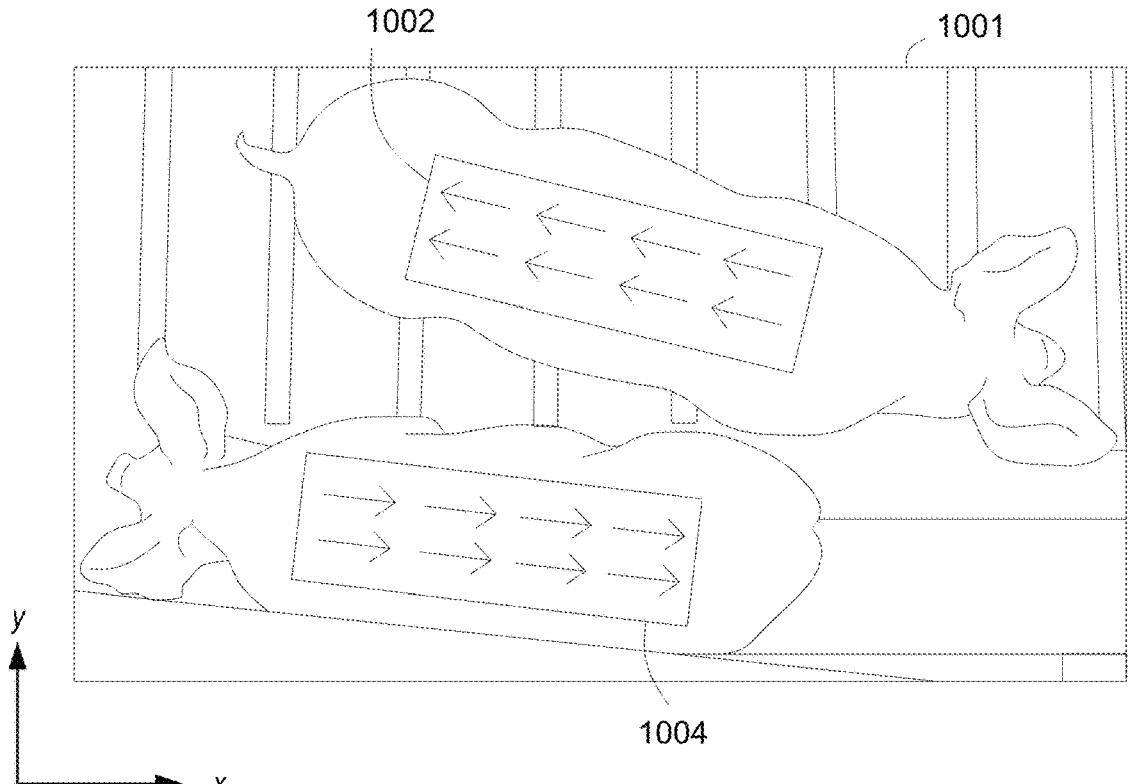
FIG. 10A is a graphical representation illustrating an exemplary affinity field map for a key point set, according to embodiments of the disclosure.

An exemplary affinity field map for a key point set is illustrated in FIG. 10A. Turning to FIG. 10A, the key point set may include a shoulder key point and a buttock key point. An image 1001 in FIG. 10A depicts two pigs, and therefore includes two instances of a body segment from the shoulder key point to the buttock key point for the two pigs, respectively (e.g., each pig has an instance of the body segment). The affinity field map for the key point set includes a vector field 1002 for a first instance of the body segment of the first pig and a vector field 1004 for a second instance of the body segment of the second pig.

For each point that lies within an area belonging to the first instance of the body segment, vector field 1002 may include a unit vector for the point, with the unit vector pointing from the shoulder key point to the buttock key point of the first pig. If the point lies outside the area of the first instance of the body segment, vector field 1002 may include a zero-valued vector for the point. Here, the area belonging to the first instance of the body segment can be, for example, a rectangular area on a body of the first pig from the shoulder to the buttock of the first pig.

Similarly, for each point that lies within an area belonging to the second instance of the body segment, vector field 1004 may include a unit vector for the point, with the unit vector pointing from the shoulder key point to the buttock key point of the second pig. If the point lies outside the area of the second instance of the body segment, vector field 1004 may include a zero-valued vector for the point. The area belonging to the second instance of the body segment can also be a rectangular area on a body of the second pig from the shoulder to the buttock of the second pig.

In some embodiments, an x component and a y component can be used to represent a vector field (e.g., vector field 1002 or 1004), with the x component and they component denoting offsets of an x direction and a y direction, respectively. A direction and a location of each point in the vector field can be determined based on a combination of the x component and the y component. For example, with reference to FIG. 10A, the x component can be used to represent an offset in the x direction from the shoulder key point to the buttock key point, and the y component can be used to represent an offset in the y direction from the shoulder key point to the buttock key point.

Turning back to FIG. 2A, in some embodiments, for a key point set that includes more than two key points (e.g., a first, second and third key point), a first affinity field map 206 can be generated for the first key point and the second key point, and a second affinity field map 206 can be generated for the second key point and the third key point. Then, an affinity field map 206 for the key point set can be generated as a combination of the first affinity field map 206 and the second affinity field map 206.

With reference to FIG. 2A again, a probability map 208 for a key point may include an array of probability values for the key point, with each probability value corresponding to a location (e.g., a pixel location) in image 202 and describing a likelihood that the key point appears at the location of image 202. For example, for a first location in image 202, probability map 208 may include a probability value of "0.8," indicating that a probability that the key point appears at the first location of image 202 is 0.8; and for a second location in image 202, probability map 208 may include a probability value of "0.5," indicating that a probability that the key point appears at the second location of image 202 is 0.5. In some embodiments, each probability map 208 may be normalized by a sigmoid function so that each probability value included in probability map 208 may be in a range between 0 and 1.

Next, for each key point, detection module 105 may process a probability map 208 corresponding to the key point and generate a location map 210 for the key point. For example, detection module 105 may use a local maximum algorithm to determine one or more locations of the key point in image 202, such that each location of the key point corresponds to a pixel location having a local maximum probability value in probability map 208 of the key point. Detection module 105 generates location map 210 for the key point so that the one or more locations of the key point may be identified in location map 210. As a result, detection module 105 may generate a group of location maps 210 from the group of probability maps 208 for the group of key points.

Detection module 105 may combine the group of location maps 210 to generate a combined location map 212. Combined location map 212 may identify one or more locations for each key point, such that at least a part or all of the locations of the group of key points are identified in combined location map 212.

Detection module 105 may also be configured to determine a group of segment clusters 214 for the group of key point sets based on combined location map 212 and the group of affinity field maps 206, as described below in more details. Each segment cluster 214 for a corresponding key point set includes one or more instances of an animal segment associated with the key point set. For example, assume that a key point set includes a head key point and a shoulder key point that form a neck portion of an animal. A segment cluster 214 for the key point set may include one or more instances of the neck portion, with each instance of the neck portion representing a neck of a different animal in image 202.

Specifically, for each key point set that includes a first key point and a second key point, detection module 105 may determine one or more first locations of the first key point and one or more second locations of the second key point from combined location map 212. Detection module 105 may match the one or more first locations of the first key point to the one or more second locations of the second key point to form a segment cluster 214 for the key point set based on an affinity field map 206 of the key point set.

For example, for each first location of the first key point, detection module 105 may measure one or more degrees of association between the first location of the first key point and the one or more second locations of the second key point based on affinity field map 206 of the key point set. Then, detection module 105 may determine a maximum degree of association from the one or more degrees of association and determine whether the maximum degree of association satisfies an association threshold. The association threshold may have a value of 0.5 or another suitable value. Responsive to the maximum degree of association satisfying the association threshold (e.g., the maximum degree of association being greater than or equal to the association threshold), detection module 105 may form an instance of the animal segment in a segment cluster 214 of the key point set by associating the first location of the first key point with a second location of the second key point that corresponds to the maximum degree of association. The instance of the animal segment appears between the first location and the second location in image 202.

Figure 10B:
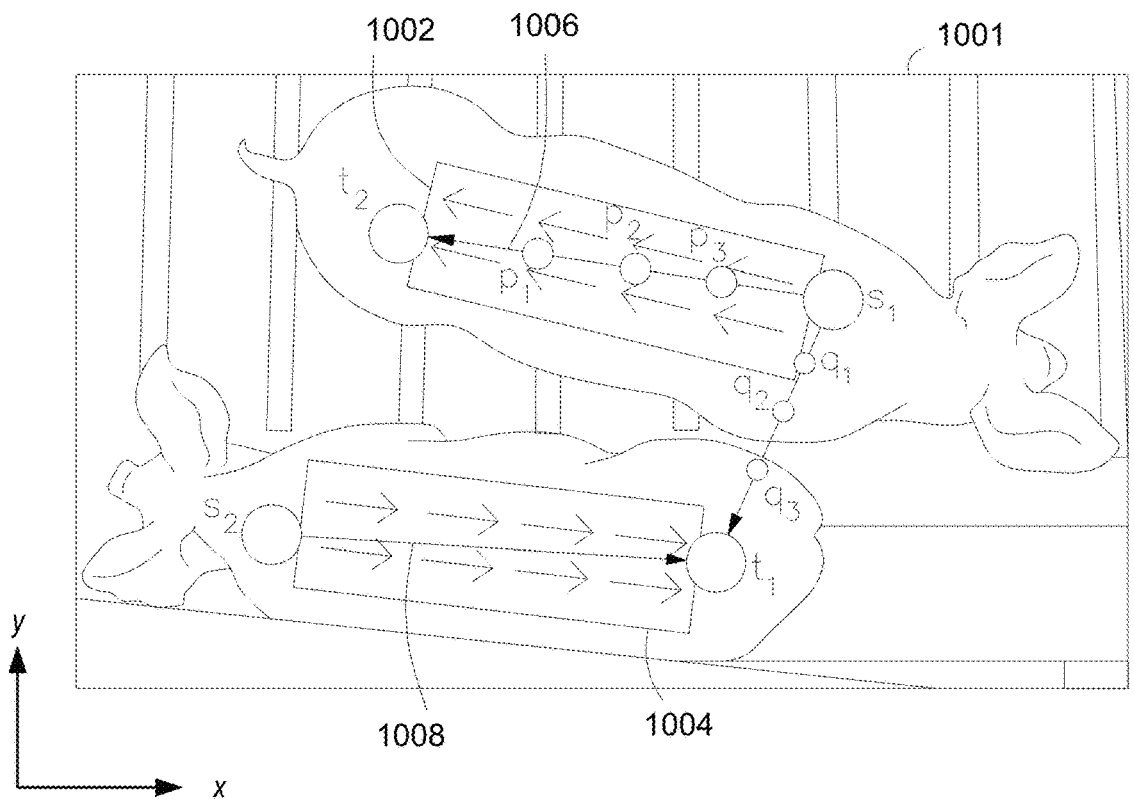
FIG. 10B is a graphical representation illustrating an exemplary process to generate a segment cluster based on the affinity field map of FIG. 10A, according to embodiments of the disclosure.

An exemplary process to generate a segment cluster for a key point set is illustrated with reference to FIG. 10B. Turning to FIG. 10B, in image 1001, two locations $s_1$ and $s_2$ are identified as shoulder key points for two pigs, and two locations $t_1$ and $t_2$ are identified as buttock key points for the two pigs. To match the locations $s_1$ and $s_2$ of the shoulder key points to the locations $t_1$ and $t_2$ of the buttock key points, a degree of association ($E(s_i, t_j)$, with $1 \leq i \leq 2$ and $1 \leq j \leq 2$) is measured between each location of the shoulder key points and each location of the buttock key points.

In some embodiments, for locations $s_i$ and $t_j$ of the shoulder key points and the buttock key points, N sampling points can be identified evenly between the two locations, and the degree of association $E(s_i, t_j)$ is calculated using the following equation:

$$E(s_i, t_j) = \sum_{n=1}^{N} F(g_n) \cdot \frac{t_j - s_i}{\|t_j - s_i\|_2}. \quad (1)$$

In the above equation, $F(g_n)$ denotes a vector field at a sampling point $g_n$, with $1 \leq n \leq N$. $F(g_n)$ can be determined from the affinity field map of FIG. 10A.

$$F(g_n) \cdot \frac{t_j - s_i}{\|t_j - s_i\|_2}$$

represents a dot product between $F(g_n)$ and $$\frac{t_j - s_i}{\|t_j - s_i\|_2}.$$

When a direction of the vector field $F(g_n)$ at each sampling point $g_n$ is identical to a direction from the location $s_i$ of a shoulder key point to the location $t_j$ of a buttock key point, the degree of association $E(s_i, t_j)$ may achieve a maximum value of 1, indicating that a strongest association exists between the location $s_i$ of the shoulder key point and the location $t_j$ of the buttock key point. When the vector field $F(g_n)$ at each sampling point $g_n$ has a zero-valued vector (e.g., $F(g_n)=0$), the degree of association $E(s_i, t_j)$ may achieve a value of 0, indicating no association between the location $s_i$ of the shoulder key point and the location $t_j$ of the buttock key point.

For example, with reference to FIG. 10B, to determine a degree of association $E(s_1, t_2)$ between the location $s_1$ of the shoulder key point and the location $t_2$ of the buttock key point, three sampling points $p_1$, $p_2$, and $p_3$ are identified evenly on a line that connects $s_1$ to $t_2$. Then, the degree of association $E(s_1, t_2)$ can be calculated as $$E(s_1, t_2) = \sum_{n=1}^{3} F(p_n) \cdot \frac{t_2 - s_1}{\|t_2 - s_1\|_2}.$$

Similarly, to calculate a degree of association $E(s_1, t_1)$ between the location $s_1$ of the shoulder key point and the location $t_1$ of the buttock key point, three sampling points $q_1$, $q_2$, and $q_3$ are identified evenly on a line that connects $s_1$ to $t_1$. Then, $E(s_1, t_1)$ can be calculated as $$E(s_1, t_1) = \sum_{n=1}^{3} F(q_n) \cdot \frac{t_1 - s_1}{\|t_1 - s_1\|_2}.$$

In FIG. 10B, the vector field $F(q_n)$ at each sampling point $q_n$ ($1 \leq n \leq 3$) has a zero-valued vector (e.g., $F(q_n)=0$), and so, $E(s_1, t_1)$ may have a value of 0, indicating no association between the location $s_1$ of the shoulder key point and the location $t_1$ of the buttock key point. On the other hand, since the direction of the vector field $F(p_n)$ at each sampling point $p_n$ is substantially identical to the direction from the location $s_1$ of the shoulder key point to the location $t_2$ of the buttock key point, $E(s_1, t_2)$ may have a non-zeroed value and thus greater than $E(s_1, t_1)$. The value of $E(s_1, t_2)$ may also be greater than an association threshold (e.g., a threshold of 0.5). Thus, the location $s_1$ of the shoulder key point is associated with the location $t_2$ of the buttock key point to form a first instance of the body segment. That is, both the location $s_1$ of the shoulder key point and the location $t_2$ of the buttock key point belong to the first instance of the body segment (e.g., $s_1$ and $t_2$ belongs to the first pig). The first instance of the body segment is illustrated with a connection 1006 in FIG. 10B and appears between the location $s_1$ and the location $t_2$ in image 1001.

Similarly, the location $s_2$ of the shoulder key point is associated with the location $t_1$ of the buttock key point to form a second instance of the body segment (e.g., $s_2$ and $t_1$ belong to the second pig). The second instance of the body segment is illustrated with a connection 1008 in FIG. 10B and appears between the location $s_2$ and the location $t_1$ in image 1001.

As a result, a segment cluster is generated for the key point set. The segment cluster includes the first instance of the body segment of the first pig (shown as connection 1006) and the second instance of the body segment of the second pig (shown as connection 1008).

Turning back to FIG. 2A again, by performing operations similar to those described above, detection module 105 may generate a segment cluster for each key point set. Thus, the group of segment clusters 214 is generated for the group of key point sets, respectively.

Detection module 105 may classify each instance of each animal segment in the group of segment clusters 214 into one or more connection graphs 216, such that one or more instances of one or more animal segments belonging to the same animal are aggregated into the same connection graph 216. Each connection graph 216 may outline a presence of an animal in image 202.

For example, assume that a first key point set may include a head key point and a shoulder key point that form a neck portion, and a second key point set may include the shoulder key point and a third key point (e.g., a left front elbow joint key point) that form a limb (e.g., a left front elbow). A first segment cluster 214 for the first key point set may include one or more instances of the neck portion. For example, a first instance of the neck portion appears between a location L11 of the first key point and a location L21 of the second key point, and a second instance of the neck portion appears between a location L12 of the first key point and a location L22 of the second key point. A second segment cluster 214 for the second key point set may include one or more instances of the left front elbow. For example, a first instance of the left front elbow appears between the location L21 of the second key point and a location L31 of the third key point, and a second instance of the left front elbow appears between the location L22 of the second key point and a location L32 of third key point.

Then, detection module 105 may determine that the first instance of the neck portion and the first instance of the left front elbow belong to a first animal appearing in image 202 since they have the location L21 of the second key point in common. A first connection graph 216 may be generated for the first animal to include a connection representing the first instance of the neck portion and a connection representing the first instance of the left front elbow. Similarly, detection module 105 may determine that the second instance of the neck portion and the second instance of the left front elbow belong to a second animal appearing in image 202 since they share the location L22 of the second key point. A second connection graph 216 may be generated for the second animal to include a connection representing the second instance of the neck portion and a connection representing the second instance of the left front elbow.

Detection module 105 may be further configured to detect one or more animals present in the region of interest based on one or more connection graphs 216. For example, detection module 105 may determine a total number 218 of animals present in the region of interest to be equal to a total number of connection graphs 216 in image 202.

In another example, detection module 105 may determine a geographical position 220 of each animal present in the region of interest based on a location of a corresponding connection graph 216 in image 202. The location of the corresponding connection graph 216 in image 202 can be a location of a point (e.g., a center point) of the corresponding connection graph 216. Specifically, detection module 105 may convert the location of the corresponding connection graph 216 in image 202 into a geographical position 220 in the region of interest. Geographical position 220 can be, for example, a geographical coordinate in the region of interest. For example, if the location of connection graph 216 is at the center of image 202, then geographical position 220 for an animal corresponding to connection graph 216 is at a center point of the region of interest.

Detection module 105 may also be configured to determine one or more postures of the one or more animals based on one or more connection graphs 216. Specifically, detection module 105 may determine a posture 222 of each animal present in the region of interest based on a corresponding connection graph 216 of the animal. For example, the corresponding connection graph 216 may indicate that posture 222 of the animal can be a standing posture, a laying down posture or any other suitable posture.

In some embodiments, each connection graph 216 may include one or more body connections (or, torso connections), one or more limb connections, or a combination thereof. A body connection can be a connection formed by body key points. A limb connection can be a connection formed by limb key points or formed by a combination of a limb key point and a body key point. Exemplary body connections and limb connections are shown in FIG. 8A.

In some embodiments, detection module 105 may determine a total number 218 of the animals and a geographical position 220 of each animal based on the one or more body connections in each connection graph 216. For example, the total number 218 of animals can be equal to a total number of connection graphs 216 that have at least a body connection. In other words, if a connection graph 216 only has a limb connection, it may not be counted as an individual animal during a calculation of the total number 218 of animals. Besides, geographical position 220 of each animal can be determined based on a location of a body connection in a corresponding connection graph 216.

In some embodiments, detection module 105 may determine a posture 222 of an animal based on the one or more body connections and the one or more limb connections of a corresponding connection graph 216. For example, if image 202 is taken from a top view perspective, the posture 222 of the animal can be determined as a laying down posture if the corresponding connection graph 216 includes one or more body connections and one or more limb connections (e.g., both a body and one or more limbs of the animal can be seen in image 202). On the other hand, the posture of the animal can be determined as a standing posture if the corresponding connection graph 216 only includes one or more body connections (e.g., only the body of the animal can be seen in image 202).

Analysis module 106 may be configured to perform a behavior analysis 224 on the one or more animals detected in image 202 based on the one or more postures of the one or more animals and generate an analysis result thereof. Analysis module 106 may perform a diagnosis on the one or more animals based on the analysis result to generate a diagnosis report 226. Analysis module 106 may further provide a message that describes the analysis result, the diagnosis report, or a combination thereof.

For example, analysis module 106 may determine whether there is any animal missing in the animal pen based on the total number 218 of animals detected in the animal pen and a number of animals that are supposed to be in the animal pen. If there is at least one animal missing in the animal pen, a warning message can be generated to alert a user of the breeding factory about the missing animal.

In another example, analysis module 106 may perform a behavior analysis on the one or more animals based on the one or more postures to identify an animal with an abnormal behavior. Analysis module 106 may perform a diagnosis on the animal with the abnormal behavior to generate a diagnosis report, and may provide a warning message that describes the abnormal behavior of the animal, the diagnosis report, or a combination thereof. For example, the animal with the abnormal behavior can be an animal that keeps a laying down posture over a predetermined period of time while other animals in the same animal pen are gathering together to eat food along a food tank. Analysis module 106 may determine that the animal with the abnormal behavior may be sick. Analysis module 106 may provide a warning message to user device 114, so that a user of the breeding factory can be notified of the sick animal.

In some embodiments, before applying animal detection model 250 to detect animals in the region of interest, training module 107 may be configured to train animal detection model 250 using a plurality of training images. The plurality of training images may capture animals with a plurality of body shapes and a plurality of postures in a plurality of living environments. The plurality of training images may be captured in a set of times with different illuminance. Thus, a diversity and a robustness of animal detection model 250 can be improved through the training of the plurality of training images.

In some embodiments, for each animal captured in a training image, training module 107 may label one or more key points of the animal at one or more locations of the training image. Training module 107 may assign a visibility attribute to each key point that is labeled at a corresponding location of the training image. The visibility attribute may indicate whether the key point labeled at the corresponding location of the training image is visible in the training image. For example, if the key point labeled at the corresponding location of the training image is visible in the training image, the visibility attribute may be identified as "visible."

In another example, if the key point labeled at the corresponding location of the training image is invisible in the training image but its location in the training image is predictable based on locations of other key points of the animal, the visibility attribute may be identified as "invisible but predictable." For example, even if a key point is invisible in the training image, its location and the locations of the other key points of the animal may obey physical characteristics of a body pattern of the animal. As a result, the location of the invisible key point in the training image can be predicted based on the locations of the other key points.

Figure 8B:
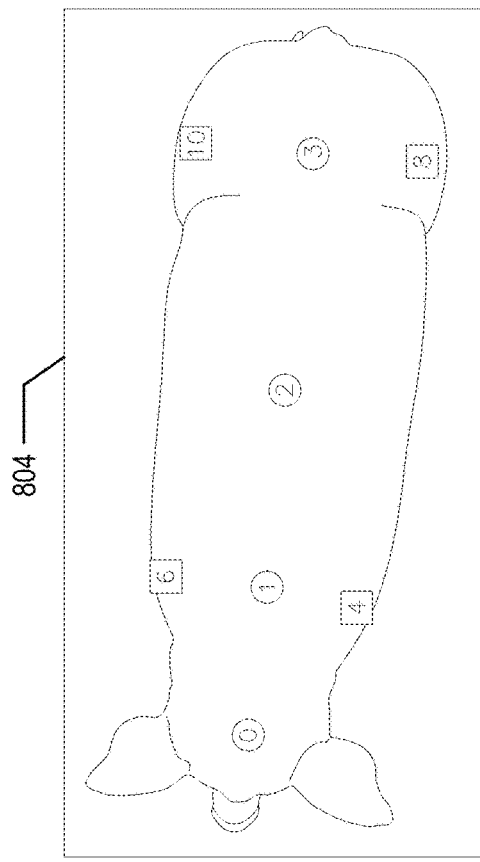
FIGS. 8A-8B are graphical representations illustrating a group of key points labeled in an animal, according to embodiments of the disclosure.
Figure 8A:
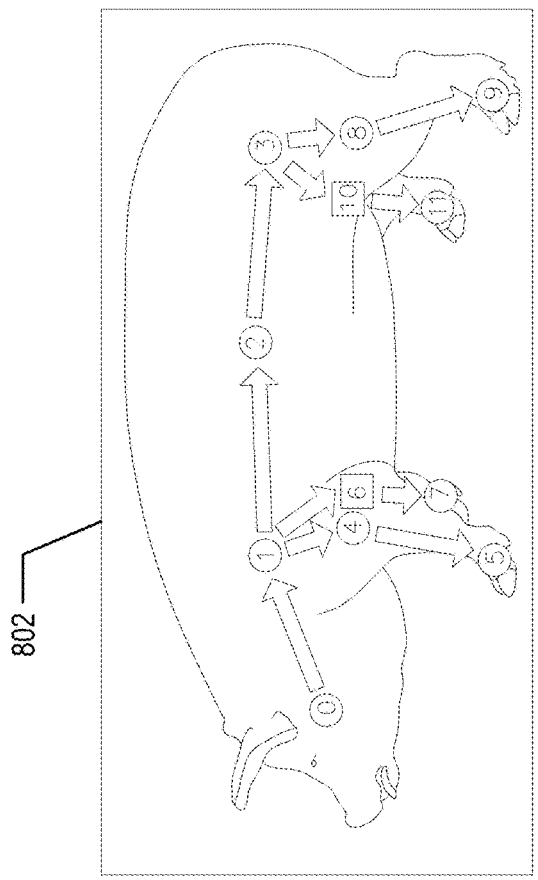

FIG. 8B illustrates exemplary key points that are invisible in an image but their locations are predictable in the image, which is described below in more details.

Thus, the training images of animal detection model 250 can be processed to identify (1) key points that are visible in the images, and (2) key points that are invisible but their locations are predictable in the images. After training of animal detection model 250 using these training images, not only key point information that is visible in an image can be processed by animal detection model 250, but also key point information that is blocked (e.g., invisible) in the image can be processed by animal detection model 250 if the blocked key point information obeys physical characteristics of a body pattern of an animal.

In some embodiments, each key point labeled in the training image is configured to have a two-dimensional Gaussian distribution. A covariance of the Gaussian distribution can be proportional to a minimal distance between the key point and one or more adjacent key points, with a proportion ratio of 0.15 or any other suitable value.

For example, a group of key points includes a head key point, a shoulder key point, and an abdomen key point. A connection graph for the key points may include a connection from the head key point to the shoulder key point and a connection from the shoulder key point to the abdomen key point. A covariance of the distribution of the head key point can be proportional to a distance between the head key point and the shoulder key point. A larger distance indicates a larger covariance of the distribution. Since the shoulder key point is connected to both the head key point and the abdomen key point, a covariance of the distribution of the shoulder key point can be proportional to a minimum of a first distance between the head key point and the shoulder key point and a second distance between the shoulder key point and the abdomen key point.

In some embodiments, a training database can be established in system 101 or computing device 112 for training animal detection model 250. The training database may include a plurality of training images. For example, the training images (e.g., 2,500 images) can be extracted from a plurality of videos (e.g., 100 videos) filmed in different breeding factories, with each video having a duration of several minutes (e.g., 5 minutes).

Figure 2B:
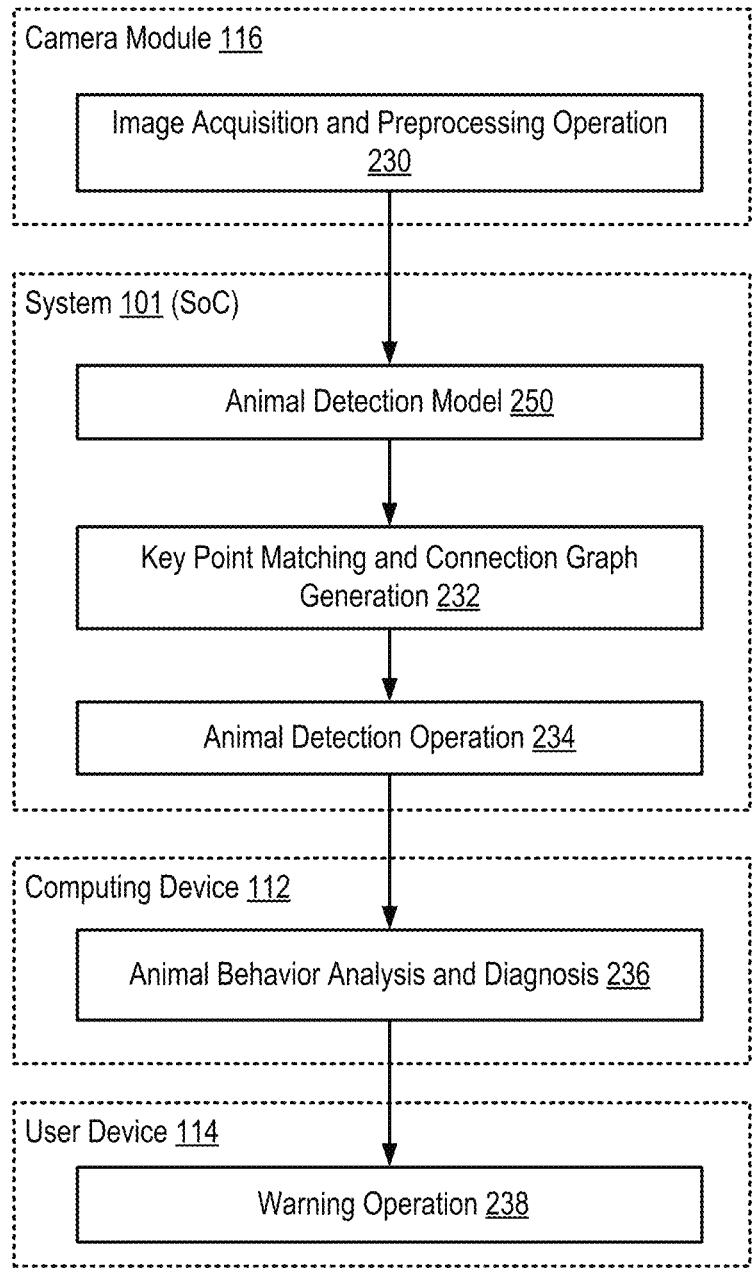
FIG. 2B illustrates another exemplary flow of operations for detecting animals in a region of interest, according to embodiments of the disclosure.

FIG. 2B illustrates another exemplary flow of operations for detecting animals in a region of interest, according to embodiments of the disclosure. The flow of operations in FIG. 2B is described with reference to operating environment 150 shown in FIG. 1B. In some embodiments, camera module 116 may perform an image acquisition and preprocessing operation 230 to generate an image. Camera module 116 may forward the image to system 101 which is embodied on an embedded IC of an SoC.

The embedded IC may include a neural network module that can be configured to implement operations of animal detection model 250. For example, detection module 105 in the embedded IC may use the neural network module to implement operations of animal detection model 250, so that a group of affinity field maps for a group of key point sets and a group of probability maps for a group of key points can be generated from the image.

Detection module 105 in the embedded IC may implement a key point matching and a connection graph generation process 232. For example, by performing operations similar to those described above with reference to FIG. 2A, detection module 105 may generate one or more connection graphs based on the group of affinity field maps and the group of probability maps.

Detection module 105 in the embedded IC may perform an animal detection operation 234 to detect one or more animals present in the region of interest based on the one or more connection graphs. For example, by performing operations similar to those described above with reference to FIG. 2A, detection module 105 may generate a detection result that describes a total number of animals present in the region of interest, a geographical position of each animal present in the region of interest, one or more postures of the one or more animals, or a combination thereof.

Detection module 105 in the embedded IC may forward the detection result to analysis module 106 implemented in computing device 112 via a wired connection or a wireless connection (e.g., a Wi-Fi or a Bluetooth connection). Analysis module 106 may perform an animal behavior analysis and diagnosis 236 based on the detection result. For example, by performing operations similar to those described above with reference to FIG. 2A, analysis module 106 may identify an animal with an abnormal behavior and generate a diagnosis report for the animal. Analysis module 106 may generate a warning message describing the abnormal behavior of the animal and the diagnosis report, and may forward the warning message to user device 114. User device 114 may perform a warning operation 238 to present the warning message to a user of the breeding factory.

Figure 2C:
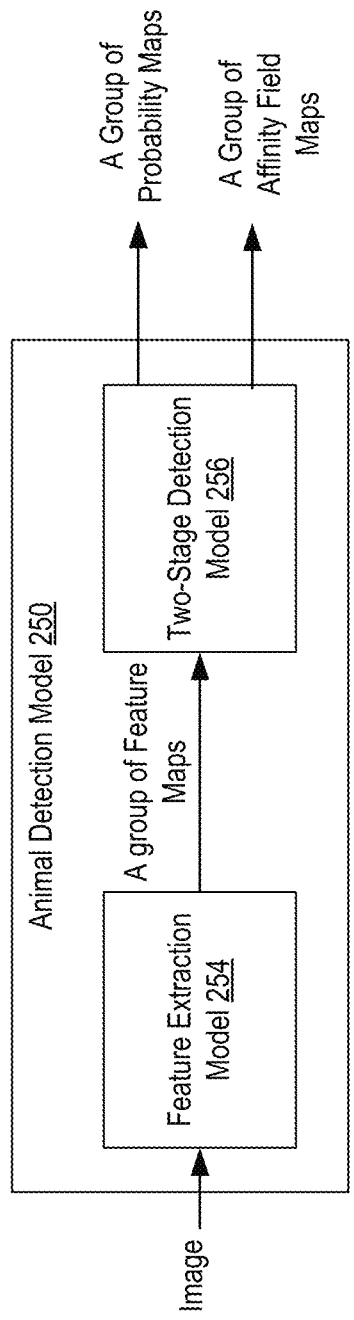
FIG. 2C illustrates a schematic diagram of an exemplary structure of an animal detection model, according to embodiments of the disclosure.

FIG. 2C illustrates a schematic diagram of an exemplary structure of animal detection model 250, according to embodiments of the disclosure. Animal detection model 250 may include a feature extraction model 254 and a two-stage detection model 256 that are applied in series. Feature extraction model 254 can be configured to receive an image that captures a scene in a region of interest and generate a group of feature maps from the image using a series of depthwise separable convolutional blocks. Feature extraction model 254 is described below with reference to FIGS. 3A-3D. Two-stage detection model 256 can be configured to generate a group of probability maps and a group of affinity field maps based on the group of feature maps. Two-stage detection model 256 is described below with reference to FIGS. 4A-4C.

Figure 3A:
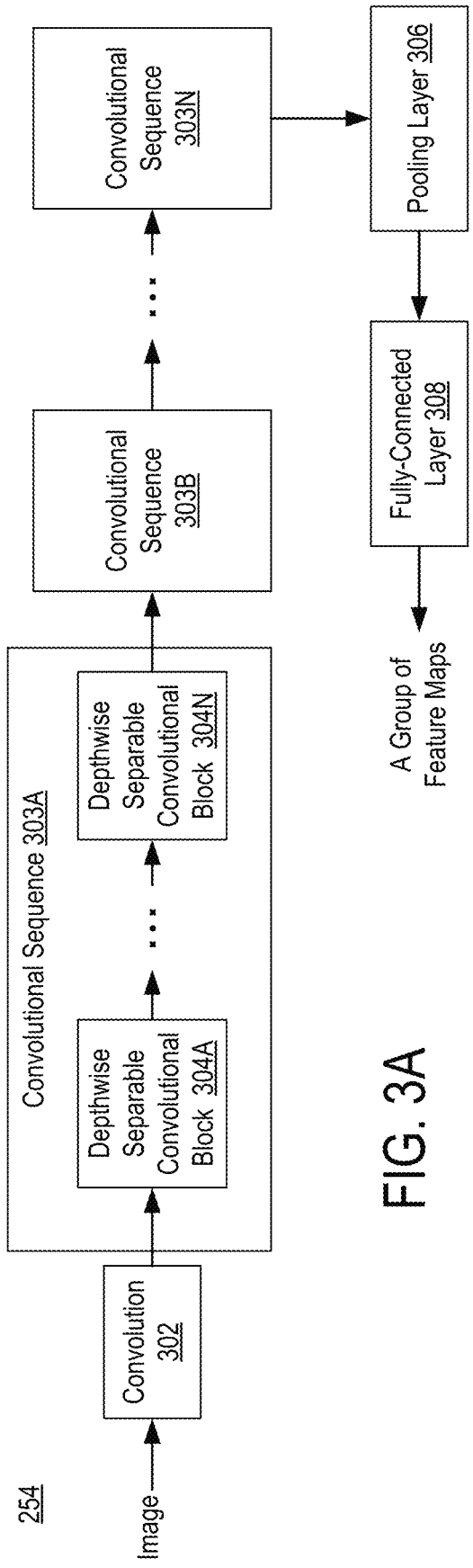
FIG. 3A illustrates a schematic diagram of an exemplary structure of a feature extraction model, according to embodiments of the disclosure.

FIG. 3A illustrates a schematic diagram of an exemplary structure of feature extraction model 254, according to embodiments of the disclosure. Feature extraction model 254 may include a convolution 302, one or more convolutional sequences 303A, 303B, . . . , 303N (also referred to as convolutional sequence 303, individually or collectively), a pooling layer 306 and a fully-connected layer 308. In some embodiments, feature extraction model 254 may have a structure similar to that of MobileNet.

Convolution 302 can be a standard convolution with a kernel size of 3×3, 32 filters and a stride of 2. An input to convolution 302 can have a size of, for example, $224^2 \times 3$. An output of convolution 302 can have a size of $112^2 \times 32$.

Each convolutional sequence 303 may include one or more depthwise separable convolutional blocks 304A, . . . , 304N (also referred to as depthwise separable convolutional block 304, individually or collectively). Depthwise separable convolutional block 304 may include a depthwise separable convolution which is a form of a factorized convolution. Depthwise separable convolutional block 304 may factorize a standard convolution into a depthwise convolution and a 1×1 convolution called a pointwise convolution. This factorization has an effect of greatly reducing a size of the model (e.g., parameters in the model can be reduced greatly).

Each depthwise separable convolutional block 304 may include an expansion layer, a depthwise convolution layer (e.g., a depthwise convolution), and a pointwise convolution layer (e.g., a pointwise convolution) that are applied in series. Each of the expansion layer, the depthwise convolution layer and the pointwise convolution layer is followed by a group normalization.

The group normalization can be a simple alternative to a batch normalization. The group normalization divides the channels into groups and computes within each group the mean and variance for normalization. For example, each group may have 4, 6 or another suitable number of channels. A computation of the group normalization is independent of batch sizes, and its accuracy is stable in a wide range of batch sizes.

Figure 3B:
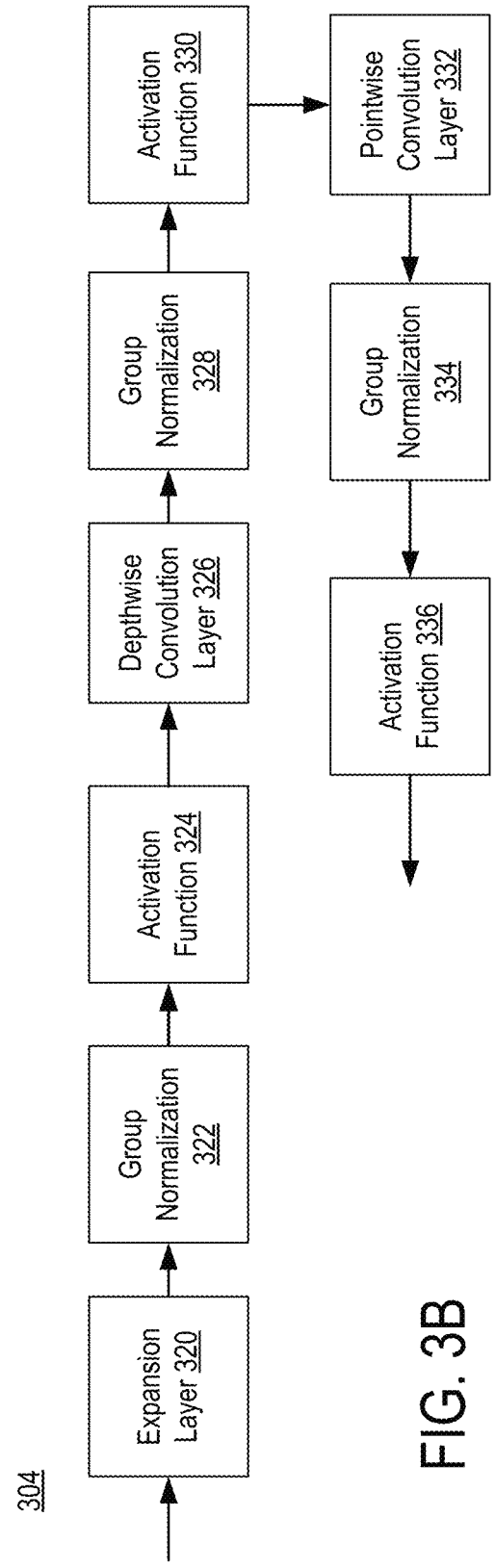
FIG. 3B illustrates a schematic diagram of an exemplary structure of a depthwise separable convolutional block, according to embodiments of the disclosure.

FIG. 3B illustrates a schematic diagram of an exemplary structure of depthwise separable convolutional block 304, according to embodiments of the disclosure. In such embodiments, block 304 has a stride of 2. Depthwise separable convolutional block 304 may include one or more of an expansion layer 320, a group normalization 322, an activation function 324 (e.g., ReLU6), a depthwise convolution layer 326, a group normalization 328, an activation function 330 (e.g., ReLU6), a pointwise convolution layer 332, a group normalization 334, and an activation function 336 (e.g., a linear activation function) that are applied in series. An output of depthwise separable convolutional block 304 is generated as an output from activation function 336.

Figures 3C, 3D:
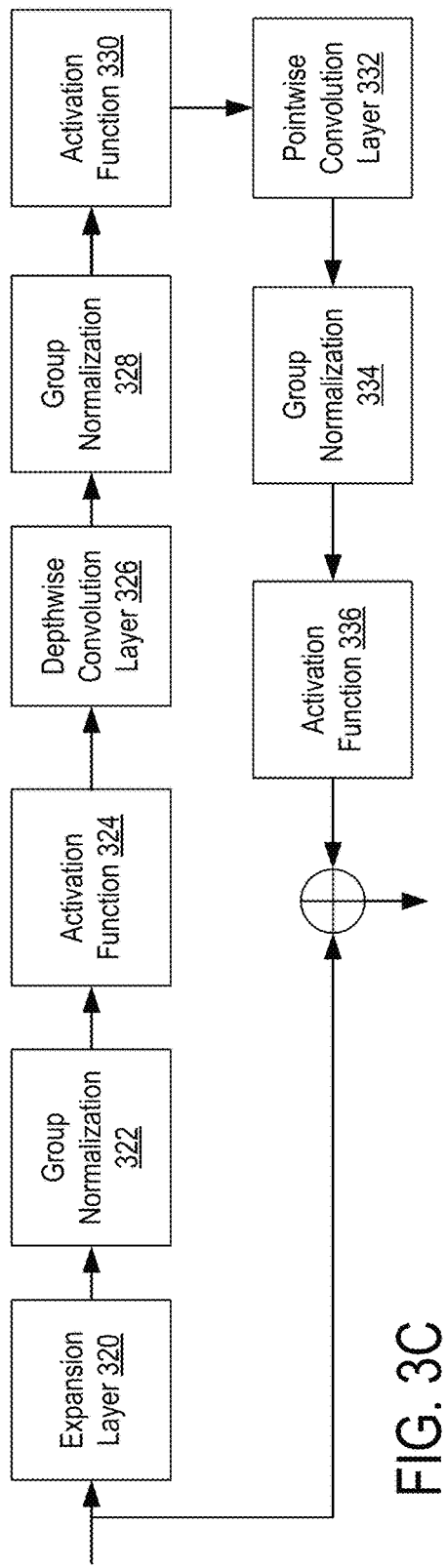
FIG. 3C illustrates a schematic diagram of another exemplary structure of a depthwise separable convolutional block in a feature extraction model, according to embodiments of the disclosure.
FIG. 3D illustrates an exemplary table that includes a list of parameters for a list of convolutional sequences, according to embodiments of the disclosure.

FIG. 3C illustrates a schematic diagram of another exemplary structure of depthwise separable convolutional block 304, according to embodiments of the disclosure. In such embodiments, block 304 has a stride of 1. Depthwise separable convolutional block 304 in FIG. 3C may include components similar to those of depthwise separable convolutional block 304 in FIG. 3B. However, an output of depthwise separable convolutional block 304 in FIG. 3C is generated by adding the output from activation function 336 to an input of depthwise separable convolutional block 304.

FIG. 3D illustrates an exemplary table (e.g., Table 1) that includes a list of parameters for a list of convolutional sequences 303, according to embodiments of the disclosure. A parameter "n" denotes a number of repeat times of depthwise separable convolutional block 304 in each convolution sequence 303 (e.g., a number of depthwise separable convolutional blocks 304 in each convolution sequence 303). A parameter "s" denotes a number of strides for a first depthwise separable convolutional block 304 in each convolution sequence 303, while the number of strides for any remaining depthwise separable convolutional block 304 in each convolution sequence 303 is 1. Parameters "t" and "c" denote an expansion factor and a number of filters (e.g., output channels) in each depthwise separable convolutional block 304 of convolutional sequence 303, respectively. All spatial convolutions use 3×3 kernels.

Each row in Table 1 describes parameter values for a corresponding convolutional sequence 303. For example, a first row of Table 1 may specify parameter values for a first convolutional sequence 303, a second row of Table 1 may specify parameter values for a second convolutional sequence 303, so on and so forth. For example, based on the second row (e.g., a row 390) of Table 1, second convolutional sequence 303 may include two depthwise separable convolutional blocks 304 (e.g., n=2), with a first depthwise separable convolutional block 304 having a stride of 2 (e.g., s=2) and a second depthwise separable convolutional block 304 having a stride of 1. Each depthwise separable convolutional block 304 in second convolutional sequence 303 may have an expansion factor of 6 (e.g., t=6) and 32 filters (e.g., c=32).

Figure 4A:
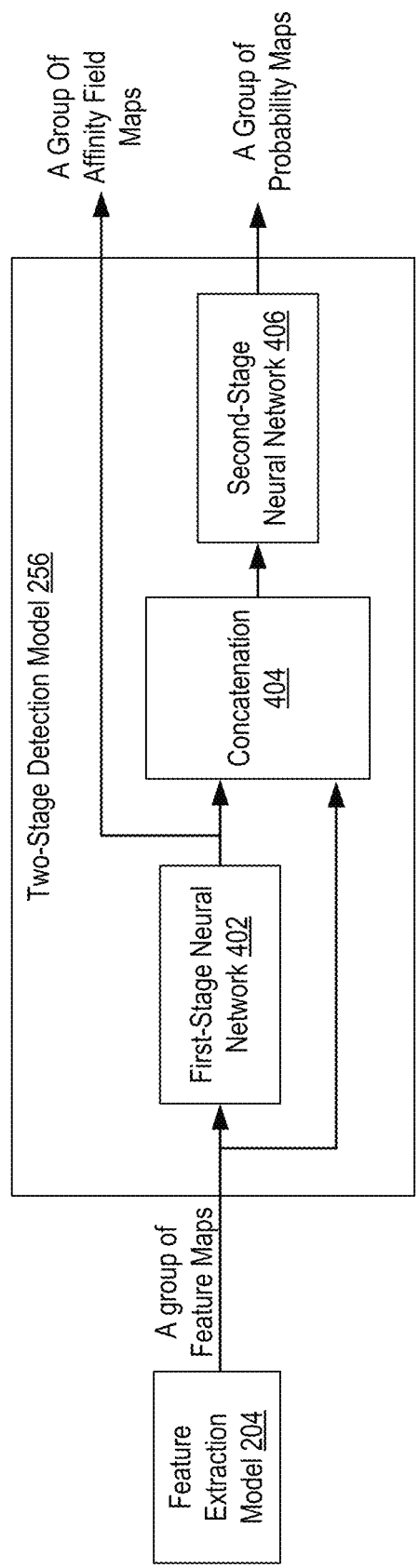
FIG. 4A illustrates a schematic diagram of an exemplary structure of a two-stage detection model, according to embodiments of the disclosure.

FIG. 4A illustrates a schematic diagram of an exemplary structure of two-stage detection model 256, according to embodiments of the disclosure. Two-stage detection model 256 may include a first-stage neural network 402 and a second-stage neural network 406. First-stage neural network 402 may be configured to produce a group of affinity field maps based on a group of feature maps from feature extraction model 204.

Second-stage neural network 406 may be configured to produce a group of probability maps based on the group of affinity field maps and the group of feature maps. For example, the group of affinity field maps and the group of feature maps can be concatenated through a concatenation operation 404 and inputted into second-stage neural network 406. Then, second-stage neural network 406 may produce the group of probability maps based on a concatenation of the group of affinity field maps and the group of feature maps.

Figure 4B:
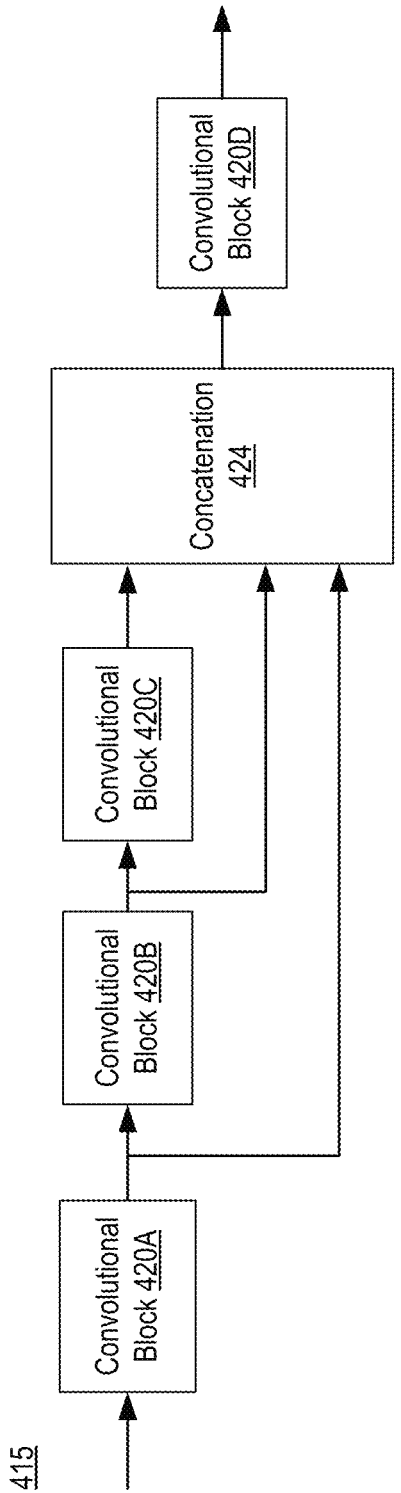
FIG. 4B illustrates a schematic diagram of an exemplary structure of a neural network in a two-stage detection model, according to embodiments of the disclosure.

FIG. 4B illustrates a schematic diagram of an exemplary structure of a neural network 415 (e.g., first-stage neural network 402 or second-stage neural network 404) in two-stage detection model 256, according to embodiments of the disclosure. For example, neural network 415 may include one or more convolutional blocks 420A, 420B, 420C and 420D (also referred to as convolutional block 420, individually or collectively).

An input to neural network 415 can be processed by convolutional block 420A to generate a first output. The first output can be inputted into convolutional block 420B to generate a second output. The second output can be inputted into convolutional block 420C to generate a third output. The first, second and third outputs are concatenated by a concatenation operation 424 and inputted into convolutional block 420D, causing convolutional block 420D to generate an output of neural network 415.

Figure 4C:
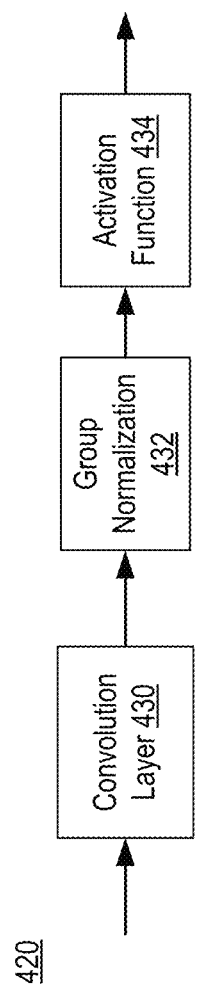
FIG. 4C illustrates a schematic diagram of an exemplary structure of a convolutional block in a neural network, according to embodiments of the disclosure.

FIG. 4C illustrates a schematic diagram of an exemplary structure of convolutional block 420 in neural network 415, according to embodiments of the disclosure. In some embodiments, convolutional block 420 may include a convolution layer 430 followed by a group normalization 432 and an activation function 434 (e.g., a parametric rectified linear unit (PReLU) activation function).

Figure 5:
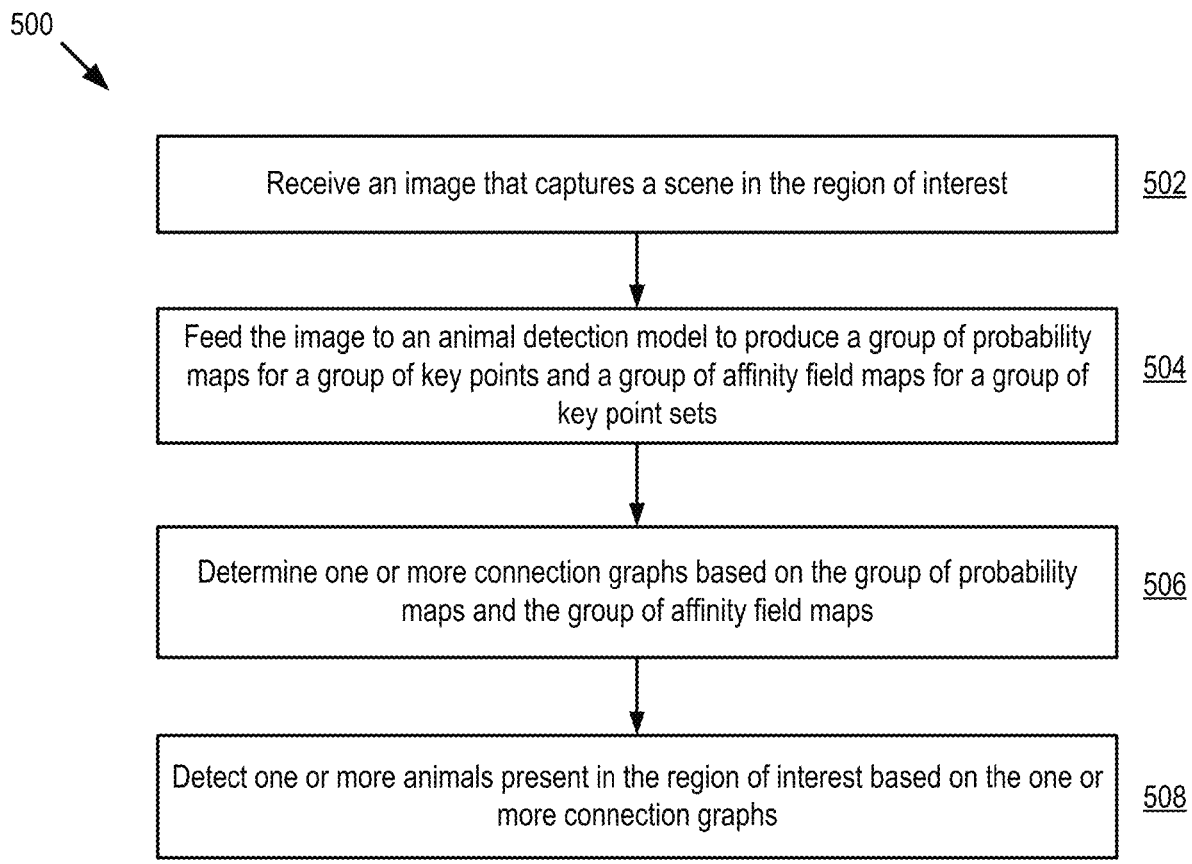
FIG. 5 is a flowchart of an exemplary method for detecting animals in a region of interest, according to embodiments of the disclosure.

FIG. 5 is a flowchart of an exemplary method 500 for detecting animals in a region of interest, according to embodiments of the disclosure. Method 500 may be implemented by system 101, specifically detection module 105, and may include steps 502-508 as described below. Some of the steps may be optional to perform the disclosure provided herein. Further, some of the steps may be performed simultaneously, or in a different order than those shown in FIG. 5.

At step 502, detection module 105 may receive an image that captures a scene in the region of interest.

At step 504, detection module 105 may feed the image to an animal detection model to produce a group of probability maps for a group of key points and a group of affinity field maps for a group of key point sets. For example, detection module 105 may perform operations similar to those described above with reference to FIG. 2A or FIG. 2B to generate the group of probability maps and the group of affinity field maps.

At step 506, detection module 105 may determine one or more connection graphs based on the group of probability maps and the group of affinity field maps. For example, detection module 105 may perform operations similar to those described above with reference to FIG. 2A or FIG. 2B to determine one or more connection graphs. In some embodiments, each connection graph may outline a presence of an animal in the image.

At step 508, detection module 105 may detect one or more animals present in the region of interest based on the one or more connection graphs. For example, based on the one or more connection graphs, detection module 105 may determine a total number of animals present in the region of interest, a geographical position of each animal present in the region of interest, and one or more postures of the one or more animals.

Figure 6:
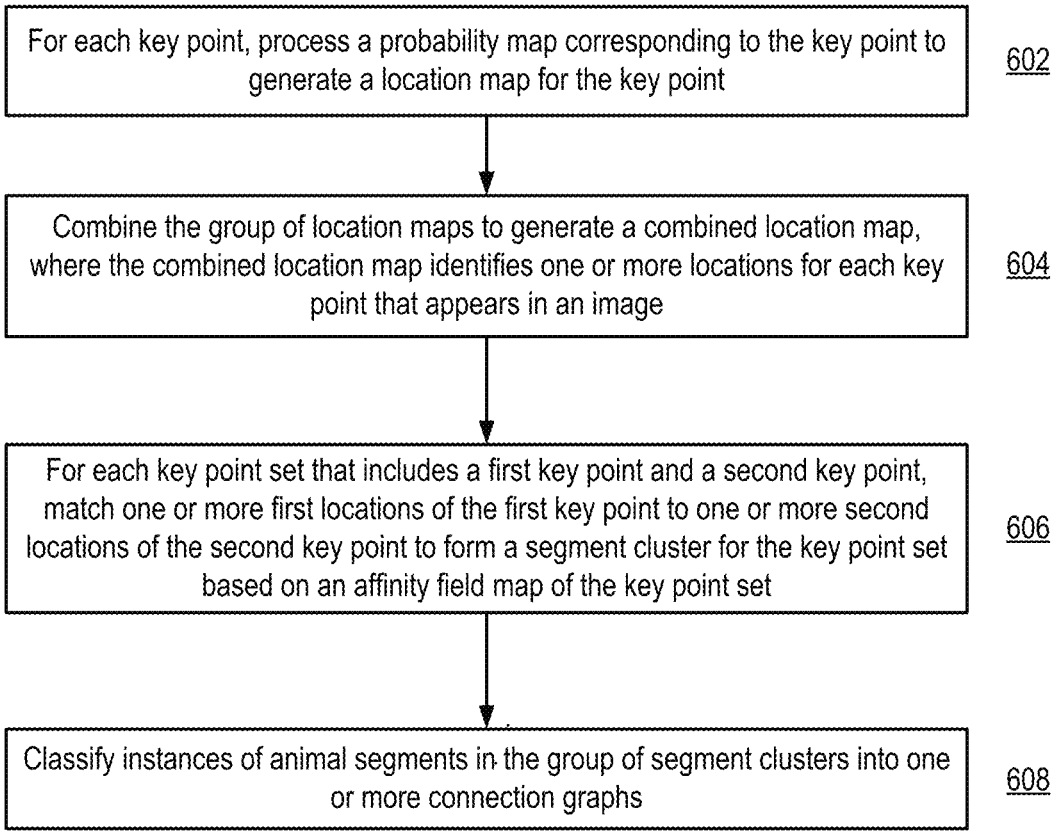
FIG. 6 is a flowchart of an exemplary method for determining one or more connection graphs, according to embodiments of the disclosure.

FIG. 6 is a flowchart of an exemplary method 600 for determining one or more connection graphs, according to embodiments of the disclosure. Method 600 may be implemented by system 101, specifically detection module 105, and may include steps 602-608 as described below. In some embodiments, method 600 may be performed to implement step 506 in FIG. 5. Some of the steps may be optional to perform the disclosure provided herein. Further, some of the steps may be performed simultaneously, or in a different order than those shown in FIG. 6.

At step 602, for each key point, detection module 105 may process a probability map corresponding to the key point to generate a location map for the key point. As a result, a group of location maps are generated from the group of probability maps, respectively.

At step 604, detection module 105 may combine the group of location maps to generate a combined location map. The combined location map may identify one or more locations for each key point that appears in an image.

At step 606, for each key point set that includes a first key point and a second key point, detection module 105 may match one or more first locations of the first key point to one or more second locations of the second key point to form a segment cluster for the key point set based on an affinity field map of the key point set. As a result, a group of segment clusters is generated for the group of key point sets, respectively. Each segment cluster for a corresponding key point set may include one or more instances of an animal segment associated with the corresponding key point set.

At step 608, detection module 105 may classify instances of animal segments in the group of segment clusters into one or more connection graphs, such that one or more instances of one or more animal segments belonging to a same animal are aggregated into a same connection graph.

Figure 7:
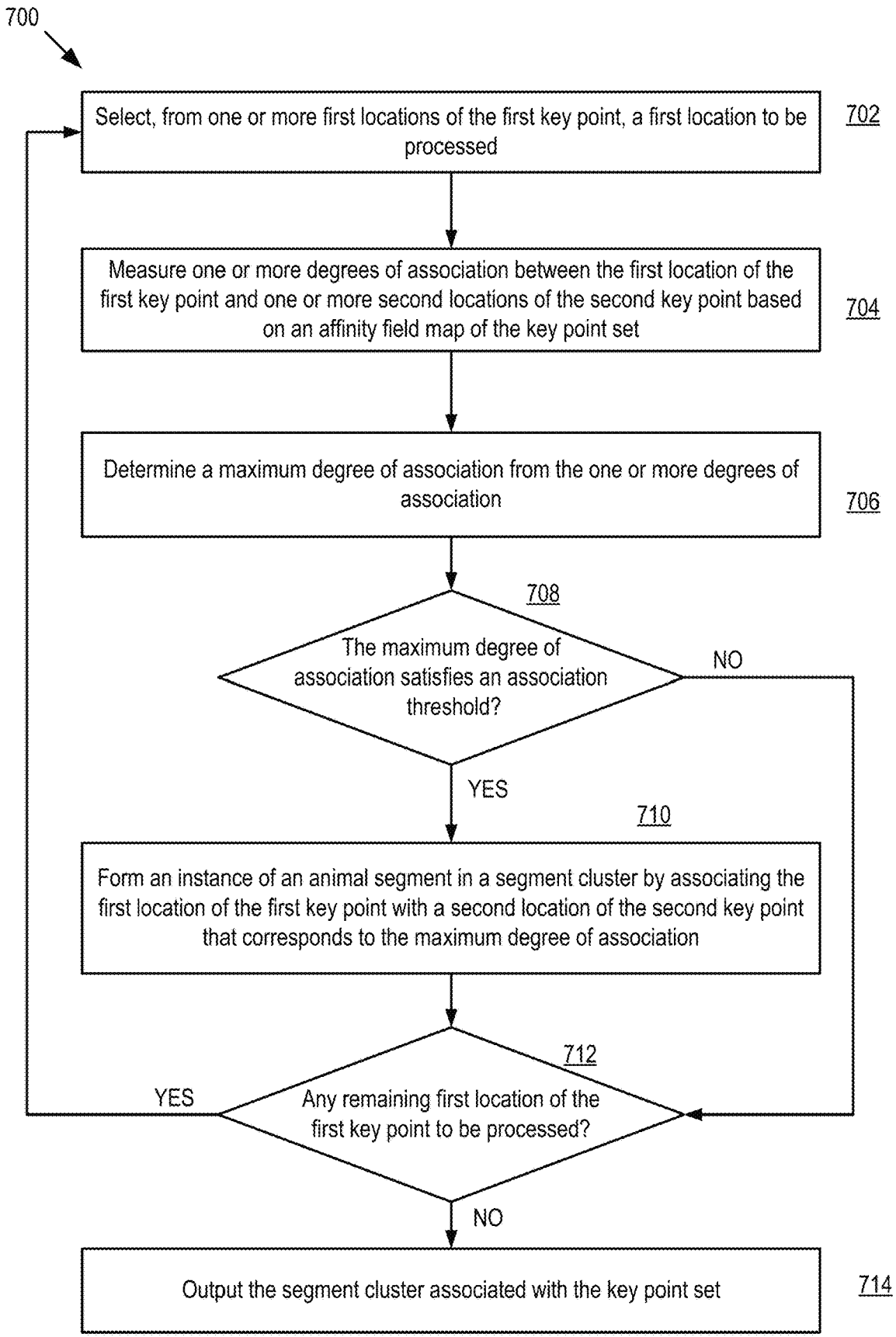
FIG. 7 is a flowchart of an exemplary method for forming a segment cluster for a key point set, according to embodiments of the disclosure.

FIG. 7 is a flowchart of an exemplary method 700 for forming a segment cluster for a key point set, according to embodiments of the disclosure. Method 700 may be implemented by system 101, specifically detection module 105, and may include steps 702-714 as described below. In some embodiments, method 700 may be performed to implement step 606 in FIG. 6. Some of the steps may be optional to perform the disclosure provided herein. Further, some of the steps may be performed simultaneously, or in a different order than those shown in FIG. 7.

In some embodiments, the key point set may include a first key point and a second key point, and the first key point and the second key point forms an animal segment such as a body segment or a limb segment. The first key point may be identified at one or more first locations at a combined location map. The second key point may be identified at one or more second locations at the combined location map.

At step 702, detection module 105 may select, from the one or more first locations of the first key point, a first location to be processed.

At step 704, detection module 105 may measure one or more degrees of association between the first location of the first key point and the one or more second locations of the second key point based on an affinity field map of the key point set.

At step 706, detection module 105 may determine a maximum degree of association from the one or more degrees of association.

At step 708, detection module 105 may determine whether the maximum degree of association satisfies an association threshold. Responsive to the maximum degree of association satisfying the association threshold, method 700 proceeds to step 710. Otherwise, method 700 proceeds to step 712.

At step 710, detection module 105 may form an instance of the animal segment in the segment cluster by associating the first location of the first key point with a second location of the second key point that corresponds to the maximum degree of association.

At step 712, detection module 105 may determine whether there is any remaining first location of the first key point to be processed. Responsive to there being at least a remaining first location of the first key point to be processed, method 700 returns to step 702. Otherwise, method 700 proceeds to step 714.

At step 714, detection module 105 may output the segment cluster associated with the key point set. The segment cluster may include one or more instances of the animal segment associated with the key point set.

FIGS. 8A-8B are graphical representations illustrating a group of key points labeled for an animal (e.g., a pig), according to embodiments of the disclosure. FIG. 8A shows the pig from a side view perspective, and FIG. 8B shows the pig from a top view perspective.

In some examples, a labeling approach may be used to identify key points for a pig, where the key points may include two ears of the pig, a point on an upper surface of a shoulder of the pig ("a shoulder point"), and a point on an upper surface of a buttock of the pig ("a buttock point"). Since the key points in different pigs are labeled only on surfaces of the pigs using this labeling approach, a mismatch between the key points of the different pigs can easily occur. For example, in a case where two pigs rest on a floor back-to-back, the shoulder points and the buttock points of the two pigs are close to each other, and a mismatch between the shoulder points and the buttock points of the two pigs can easily occur.

Furthermore, since the key points identified by this labeling approach are distributed unevenly on surfaces of the pigs, some of the pigs may be missed in a detection result of the pigs. For example, if the pigs gather together closely or eat food together along a tank, the ears and the shoulder points of some pigs may be blocked from sight of view and only the buttock points of the pigs are exposed. These pigs may not be identified as valid individual pigs using this labeling approach since only the buttock points of these pigs are exposed. Thus, these pigs can be missed in a detection result.

Different from the above labeling approach, key points described in the present disclosure may be labeled in a geometric center of a torso of an animal or geometric centers of the limbs of the animal (rather than being labeled on a surface of the animal). For example, a group of key points may be labeled in a pig as shown in FIG. 8A. The group of key points may include one or more of a head key point (labeled with "0"), a shoulder key point ("1"), an abdomen key point ("2"), a buttock key point ("3"), an elbow joint key point of a left front leg ("4"), a left front foot key point ("5"), an elbow joint key point of a right front leg ("6"), a right front foot key point ("7"), an elbow joint key point of a left back leg ("8"), a left back foot key point ("9"), an elbow joint key point of a right back leg ("10"), and a right back foot key point ("11").

Besides, each key point described herein may be assigned with a visibility attribute. In some embodiments, the visibility attribute may indicate that the key point is visible in an image. Alternatively, the visibility attribute may indicate that the key point is invisible in the image but its location is predictable in the image. Alternatively, the visibility attribute may indicate that the key point is invisible in the image and its location is unpredictable in the image.

For example, with reference to FIG. 8A, key points 0-5, 7-9 and 11 are visible in an image 802 and are depicted using a circle, respectively. Each of key points 0-5, 7-9 and 11 is assigned with a visibility attribute indicating that the key point is visible in image 802. On the other hand, each of key points 6 and 10 is invisible in image 802, but its location can be predicted based on a body pattern of the pig. Each of key points 6 and 10 is depicted using a rectangle, and assigned with a visibility attribute indicating that the key point is invisible in image 802 but its location is predictable in image 802.

In another example, with reference to FIG. 8B, key points 0-3 are visible in an image 804 and are depicted using a circle, respectively. Each of key points 0-3 is assigned with a visibility attribute indicating that the key point is visible in image 804. On the other hand, each of key points 4, 6, 8 and 10 is invisible in image 802, but its location can be predicted based on a body pattern of the pig. Each of key points 4, 6, 8 and 10 is depicted using a rectangle, and assigned with a visibility attribute indicating that the key point is invisible in image 804 but its location is predictable in image 804. Besides, key points 5, 7, 9 and 11 are invisible in image 804 and their locations are unpredictable in image 804. Thus, each of key points 5, 7, 9 and 11 is not identified in image 804 and is assigned with a visibility attribute indicating that the key point is invisible in image 804 and its location is unpredictable in image 804.

With reference to FIG. 8A, a connection graph for a pig is also illustrated. The connection graph includes one or more body connections (or, torso connections) and one or more limb connections. The one or more body connections include one or more of a connection from key point 0 to key point 1, a connection from key point 1 to key point 2, and a connection from key point 2 to key point 3. The one or more limb connections include one or more of a connection from key point 1 to key point 4, a connection from key point 4 to key point 5, a connection from key point 1 to key point 6, a connection from key point 6 to key point 7, a connection from key point 3 to key point 10, a connection from key point 10 to key point 11, a connection from key point 3 to key point 8, and a connection from key point 8 to key point 9.

Figure 9A:
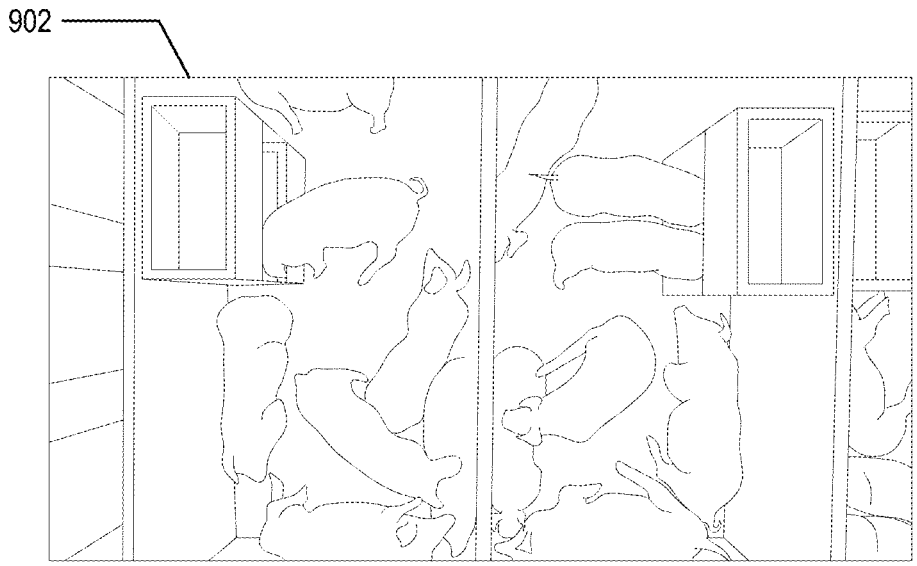
FIG. 9A is a graphical representation illustrating an exemplary image of an animal pen, according to embodiments of the disclosure.
Figure 9B:
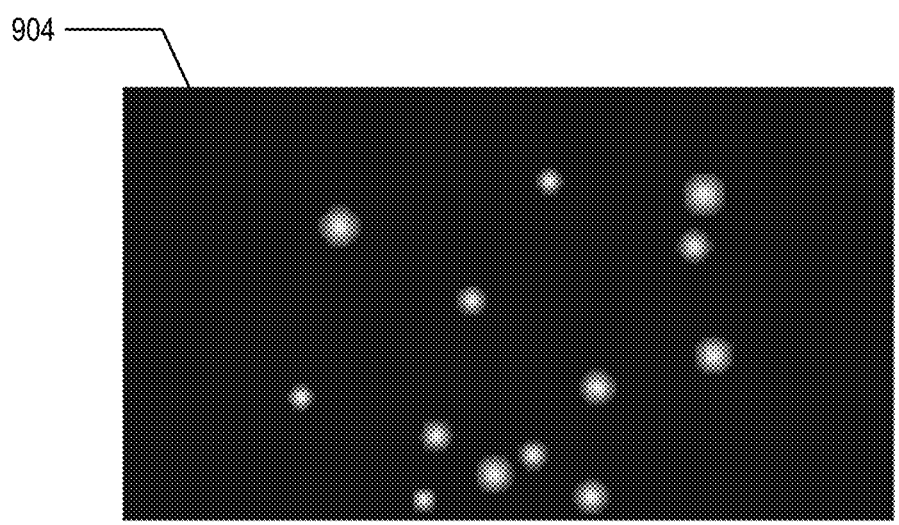
FIG. 9B is a graphical representation illustrating an exemplary location map for shoulder key points, according to embodiments of the disclosure.
Figure 9C:
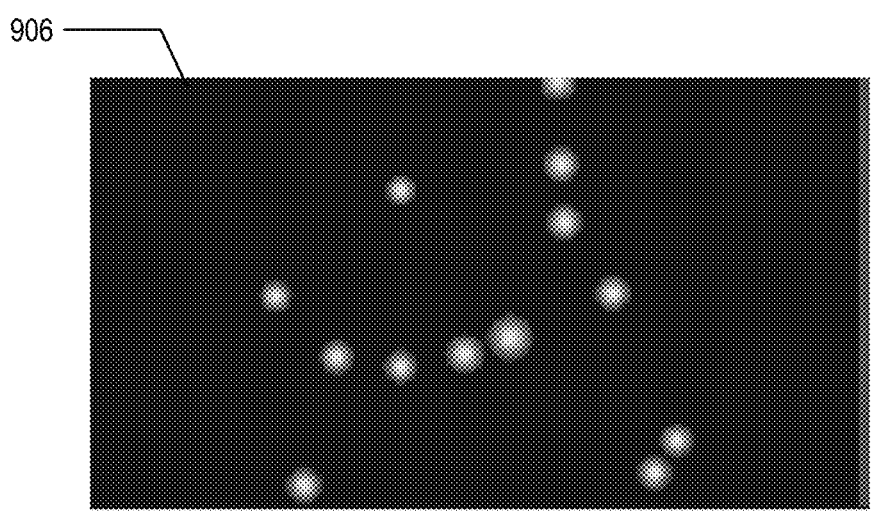
FIG. 9C is a graphical representation illustrating an exemplary location map for buttock key points, according to embodiments of the disclosure.

FIG. 9A is a graphical representation illustrating an exemplary image 902 of an animal pen, according to embodiments of the disclosure. The animal pen may be a pig pen. Image 902 is taken from a top view perspective. FIG. 9B is a graphical representation illustrating an exemplary location map 904 for shoulder key points, according to embodiments of the disclosure. Each location highlighted in location map 904 represents a shoulder key point of a corresponding pig in image 902. FIG. 9C is a graphical representation illustrating an exemplary location map 906 for buttock key points, according to embodiments of the disclosure. Each location highlighted in location map 906 represents a buttock key point of a corresponding pig in image 902.

FIG. 10A is a graphical representation illustrating an exemplary affinity field map for a key point set, according to embodiments of the disclosure. The key point set may include a shoulder key point and a buttock key point. The affinity filed map for the key point set (including vector fields 1002 and 1004) is generated from image 1001 and overlaid on image 1001 as shown in FIG. 10A. FIG. 10A is described above, and similar description will not be repeated here.

FIG. 10B is a graphical representation illustrating an exemplary process to generate a segment cluster based on the affinity field map of FIG. 10A, according to embodiments of the disclosure. Two instances of an animal segment associated with the key point set are determined based on the affinity field map of FIG. 10A. The two instances of the animal segment are illustrated using connections 1006 and 1008. FIG. 10B is described above, and similar description will not be repeated here.

Figure 11B:
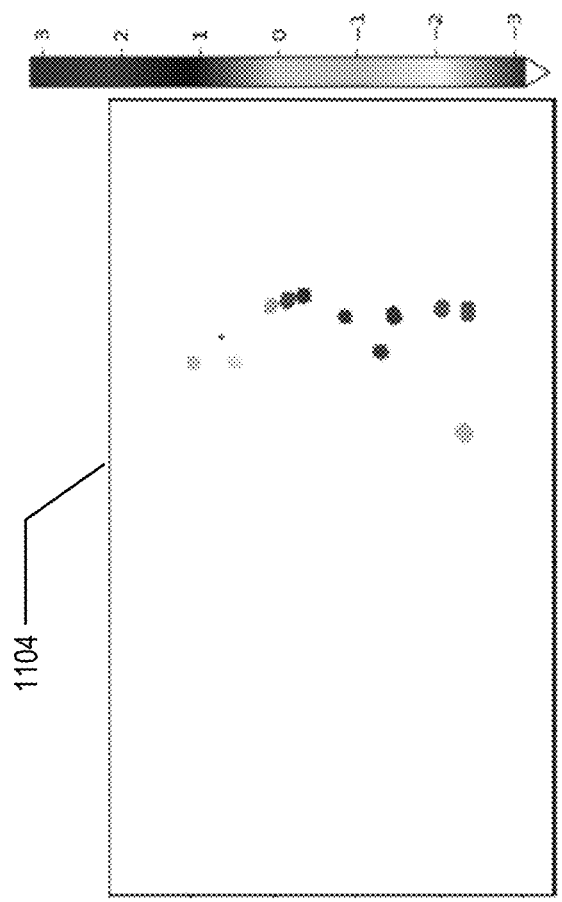
FIG. 11B is a graphical representation illustrating an exemplary affinity field map for a key point set generated from the image of FIG. 11A, according to embodiments of the disclosure.
Figure 11A:
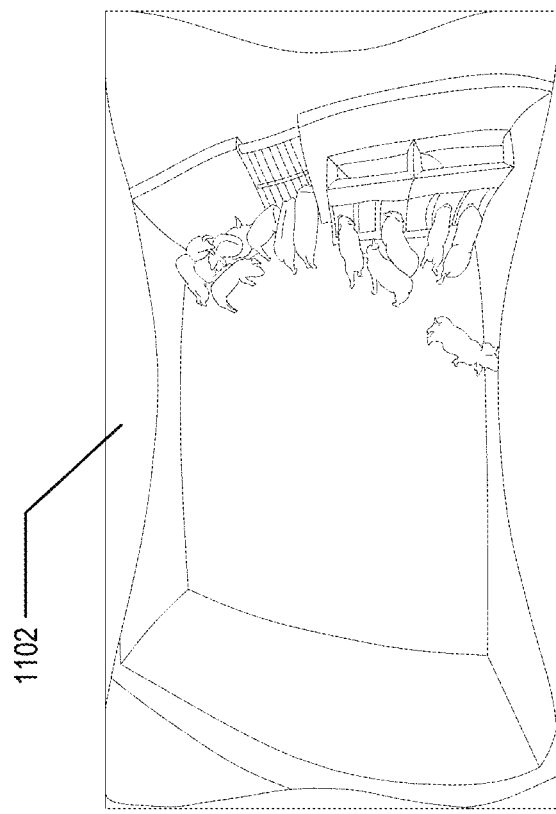
FIG. 11A is a graphical representation illustrating an exemplary image of an animal pen, according to embodiments of the disclosure.

FIG. 11A is a graphical representation illustrating an exemplary image 1102 of an animal pen, and FIG. 11B is a graphical representation illustrating an exemplary affinity field map 1104 for a key point set generated from image 1102 of FIG. 11A, according to embodiments of the disclosure. The animal pen may be a pig pen. The key point set may include a shoulder key point and a buttock key point. Affinity field map 1104 for the key point set may be generated based on image 1102. A vector field F(p) at a point p in affinity field map 1104 can be identified using an x component and a y component, e.g., F(p)=(x(p), y(p)). In some embodiments, a field value v(p) that represents an angle of the vector field F (p) at the point p can be calculated. The field value v (p) may be in a range between $-\pi$ and $\pi$. For example, the field value v(p) can be calculated as:

$$v(p)=a\tan 2(x(p),y(p)). \quad (2)$$

Figure 12:
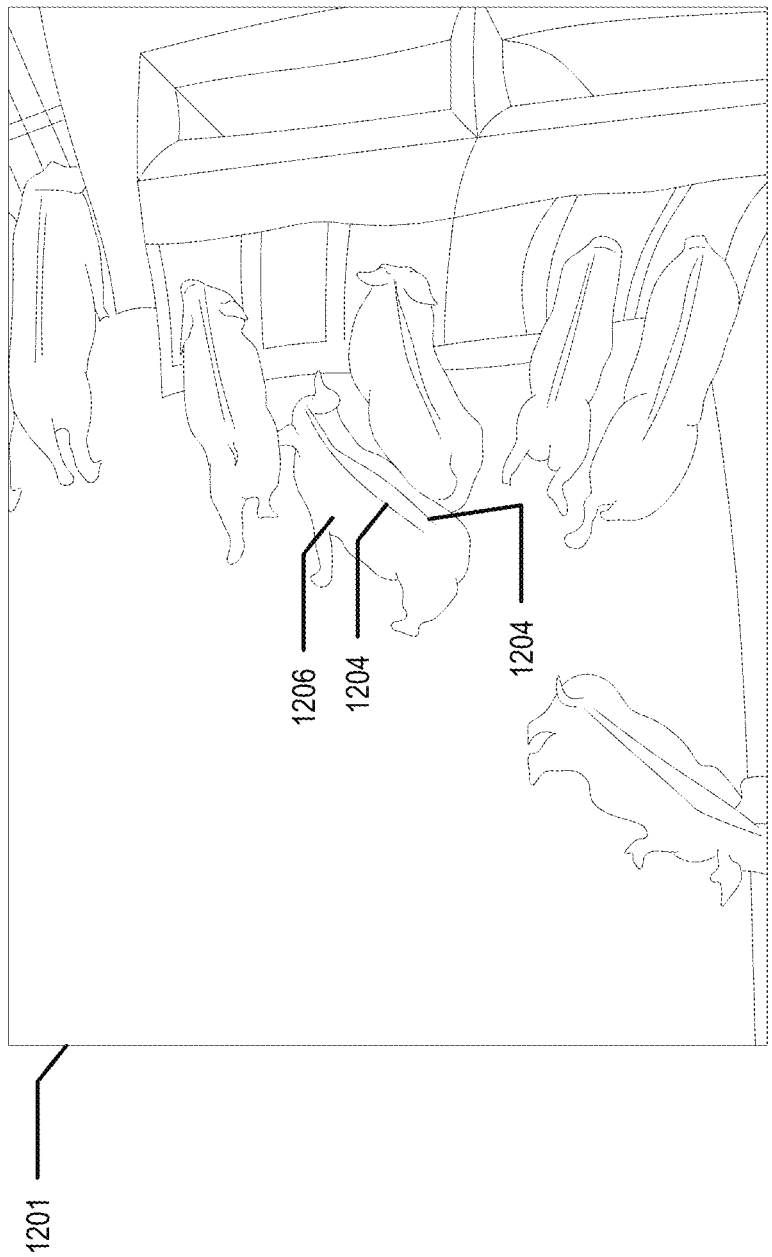
FIG. 12 is a graphical representation illustrating exemplary connection graphs for animals depicted in an image, according to embodiments of the disclosure.

FIG. 12 is a graphical representation illustrating exemplary connection graphs for animals depicted in an image 1201, according to embodiments of the disclosure. The animals may be pigs. Each connection graph may include a connection from a head key point to a shoulder key point and a connection from the shoulder key point to a buttock key point. For each pig in image 1201, both a connection graph labeled manually and a connection graph generated by detection module 105 are illustrated in FIG. 12. For example, for a pig 1206, a connection graph 1204 labeled manually and a connection graph 1202 generated by detection module 105 are provided.

In FIG. 12, the connection graphs labeled manually and the connection graphs generated by detection module 105 are substantially consistent with each other. In some cases, locations of some key points identified by detection module 105 are more accurate than locations of the key points that are manually labeled. Thus, the animal detection system and method described herein can identify the animals accurately from image 1201.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

According to one aspect of the present disclosure, a method for detecting animals in a region of interest is disclosed. An image that captures a scene in the region of interest is received. The image is fed to an animal detection model to produce a group of probability maps for a group of key points and a group of affinity field maps for a group of key point sets. One or more connection graphs are determined based on the group of probability maps and the group of affinity field maps. Each connection graph outlines a presence of an animal in the image. One or more animals present in the region of interest are detected based on the one or more connection graphs.

In some embodiments, detecting the one or more animals present in the region of interest includes determining a total number of animals present in the region of interest to be equal to a total number of connection graphs in the one or more connection graphs.

In some embodiments, detecting the one or more animals present in the region of interest includes determining a geographical position of each animal present in the region of interest based on a location of a corresponding connection graph in the image.

In some embodiments, one or more postures of the one or more animals are determined based on the one or more connection graphs.

In some embodiments, a behavior analysis is performed on the one or more animals based on the one or more postures to generate an analysis result. A diagnosis is performed on the one or more animals based on the analysis result to generate a diagnosis report. A message that describes the analysis result, the diagnosis report, or a combination thereof is provided.

In some embodiments, the group of key points includes one or more of a head key point, a shoulder key point, an abdomen key point, a buttock key point, an elbow joint key point of a left front leg, a left front foot key point, an elbow joint key point of a right front leg, a right front foot key point, an elbow joint key point of a left back leg, a left back foot key point, an elbow joint key point of a right back leg, and a right back foot key point.

In some embodiments, the animal detection model is configured to generate a group of feature maps from the image using a series of depthwise separable convolutional blocks. The group of probability maps and the group of affinity field maps are produced from the group of feature maps.

In some embodiments, the animal detection model includes a feature extraction model configured to generate the group of feature maps from the image using the series of depthwise separable convolutional blocks. Each depthwise separable convolutional block includes an expansion layer, a depthwise convolution layer and a pointwise convolution layer that are applied in series. Each of the expansion layer, the depthwise convolution layer and the pointwise convolution layer is followed by a group normalization.

In some embodiments, the animal detection model includes a two-stage detection model that includes a first-stage neural network and a second-stage neural network. The first-stage neural network is configured to produce the group of affinity field maps based on the group of feature maps. The second-stage neural network is configured to produce the group of probability maps based on the group of affinity field maps and the group of feature maps. Each of the first-stage neural network and the second-stage neural network includes one or more convolutional blocks, with each convolutional block including a convolution layer followed by a group normalization and a PReLU activation function.

In some embodiments, the animal detection model is trained using a plurality of training images that depict animals with a plurality of body shapes and postures in a plurality of living environments. The plurality of training images are captured at a plurality of times with different illuminance.

In some embodiments, for each animal captured in a training image, one or more key points of the animal are labeled at one or more locations of the training image. A visibility attribute is assigned to each key point labeled at a corresponding location of the training image.

In some embodiments, each key point labeled in the training image is configured to have a two-dimensional Gaussian distribution, with a covariance of the Gaussian distribution being proportional to a minimal distance between the key point and one or more adjacent key points.

In some embodiments, determining the one or more connection graphs includes:

generating a combined location map based on the group of probability maps; determining a group of segment clusters for the group of key point sets based on the combined location map and the group of affinity field maps, where each segment cluster for a corresponding key point set includes one or more instances of an animal segment associated with the key point set; and classifying each instance of each animal segment in the group of segment clusters into the one or more connection graphs such that one or more instances of one or more animal segments belonging to a same animal are aggregated into a same connection graph.

In some embodiments, generating the combined location map based on the group of probability maps includes: for each key point, processing a probability map corresponding to the key point to generate a location map for the key point, so that a group of location maps are generated for the group of probability maps; and combining the group of location maps to generate the combined location map.

In some embodiments, determining the group of segment clusters for the group of key point sets includes: for each key point set that includes a first key point and a second key point, matching one or more first locations of the first key point to one or more second locations of the second key point to form a segment cluster for the key point set based on an affinity field map of the key point set, so that the group of segment clusters is generated for the group of key point sets.

In some embodiments, matching the one or more first locations of the first key point to the one or more second locations of the second key point to form the segment cluster includes: for each first location of the first key point, measuring one or more degrees of association between the first location of the first key point and the one or more second locations of the second key point based on the affinity field map of the key point set; determining a maximum degree of association from the one or more degrees of association; determining whether the maximum degree of association satisfies an association threshold; and responsive to the maximum degree of association satisfying the association threshold, forming an instance of the animal segment in the segment cluster by associating the first location of the first key point with a second location of the second key point that corresponds to the maximum degree of association. The instance of the animal segment appears between the first location and the second location in the image.

According to another aspect of the present disclosure, a system for detecting animals in a region of interest is disclosed. The system includes a memory and a processor. The memory is configured to store instructions. The processor is coupled to the memory and configured to execute the instructions to perform a process including: receiving an image that captures a scene in the region of interest; feeding the image to an animal detection model to produce a group of probability maps for a group of key points and a group of affinity field maps for a group of key point sets; determining one or more connection graphs based on the group of probability maps and the group of affinity field maps, where each connection graph outlines a presence of an animal in the image; and detecting one or more animals present in the region of interest based on the one or more connection graphs.

In some embodiments, the processor and the memory are implemented in an embedded IC of an SoC.

In some embodiments, the processor and the memory are implemented in a cloud computing device.

In some embodiments, the system further includes a camera module configured to acquire the image in the region of interest.

In some embodiments, to detect the one or more animals present in the region of interest, the processor is configured to execute the instructions to perform the process further including determining a total number of animals present in the region of interest to be equal to a total number of connection graphs in the one or more connection graphs.

In some embodiments, to detect the one or more animals present in the region of interest, the processor is configured to execute the instructions to perform the process further including determining a geographical position of each animal present in the region of interest based on a location of a corresponding connection graph in the image.

In some embodiments, the processor is configured to execute the instructions to perform the process further including determining one or more postures of the one or more animals based on the one or more connection graphs.

In some embodiments, the processor is configured to execute the instructions to perform the process further including: performing a behavior analysis on the one or more animals based on the one or more postures to generate an analysis result; performing a diagnosis on the one or more animals based on the analysis result to generate a diagnosis report; and providing a message that describes the analysis result, the diagnosis report, or a combination thereof.

In some embodiments, the group of key points includes one or more of a head key point, a shoulder key point, an abdomen key point, a buttock key point, an elbow joint key point of a left front leg, a left front foot key point, an elbow joint key point of a right front leg, a right front foot key point, an elbow joint key point of a left back leg, a left back foot key point, an elbow joint key point of a right back leg, and a right back foot key point.

In some embodiments, the animal detection model is configured to generate a group of feature maps from the image using a series of depthwise separable convolutional blocks. The group of probability maps and the group of affinity field maps are produced from the group of feature maps.

In some embodiments, the animal detection model includes a feature extraction model configured to generate the group of feature maps from the image using the series of depthwise separable convolutional blocks. Each depthwise separable convolutional block includes an expansion layer, a depthwise convolution layer and a pointwise convolution layer that are applied in series. Each of the expansion layer, the depthwise convolution layer and the pointwise convolution layer is followed by a group normalization.

In some embodiments, the animal detection model includes a two-stage detection model that includes a first-stage neural network and a second-stage neural network. The first-stage neural network is configured to produce the group of affinity field maps based on the group of feature maps. The second-stage neural network is configured to produce the group of probability maps based on the group of affinity field maps and the group of feature maps. Each of the first-stage neural network and the second-stage neural network includes one or more convolutional blocks, with each convolutional block including a convolution layer followed by a group normalization and a PReLU activation function.

In some embodiments, the processor is configured to execute the instructions to perform the process further including training the animal detection model using a plurality of training images that depict animals with a plurality of body shapes and postures in a plurality of living environments. The plurality of training images are captured at a plurality of times with different illuminance.

In some embodiments, the processor is configured to execute the instructions to perform the process further including: for each animal captured in a training image, labeling one or more key points of the animal at one or more locations of the training image; and assigning a visibility attribute to each key point labeled at a corresponding location of the training image.

In some embodiments, each key point labeled in the training image is configured to have a two-dimensional Gaussian distribution, with a covariance of the Gaussian distribution being proportional to a minimal distance between the key point and one or more adjacent key points.

In some embodiments, to determine the one or more connection graphs, the processor is configured to execute the instructions to perform the process further including: generating a combined location map based on the group of probability maps, where the combined location map identifies one or more locations for each key point in the image; determining a group of segment clusters for the group of key point sets based on the combined location map and the group of affinity field maps, where each segment cluster for a corresponding key point set includes one or more instances of an animal segment associated with the key point set; and classifying each instance of each animal segment in the group of segment clusters into the one or more connection graphs such that one or more instances of one or more animal segments belonging to a same animal are aggregated into a same connection graph.

According to yet another aspect of the present disclosure, a non-transitory computer-readable storage medium is disclosed. The computer-readable storage medium is configured to store instructions which, in response to an execution by a processor, cause the processor to perform a process including: receiving an image that captures a scene in the region of interest; feeding the image to an animal detection model to produce a group of probability maps for a group of key points and a group of affinity field maps for a group of key point sets; determining one or more connection graphs based on the group of probability maps and the group of affinity field maps, where each connection graph outlines a presence of an animal in the image; and detecting one or more animals present in the region of interest based on the one or more connection graphs.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A method for detecting animals in a region of interest, comprising:
    receiving an image that captures a scene in the region of interest;
    feeding the image to an animal detection model to produce a group of probability maps for a group of key points and a group of affinity field maps for a group of key point sets, wherein the animal detection model comprises a two-stage detection model including a first-stage neural network and a second-stage neural network, the first-stage neural network is configured to produce the group of affinity field maps based on a group of feature maps generated from the image, and the second-stage neural network is configured to produce the group of probability maps based on the group of affinity field maps and the group of feature maps;
    determining one or more connection graphs based on the group of probability maps and the group of affinity field maps, wherein each connection graph outlines a presence of an animal in the image; and
    detecting one or more animals present in the region of interest based on the one or more connection graphs.

2. The method of claim 1, wherein detecting the one or more animals present in the region of interest comprises:
    determining a total number of animals present in the region of interest to be equal to a total number of connection graphs in the one or more connection graphs.

3. The method of claim 1, wherein detecting the one or more animals present in the region of interest comprises:
    determining a geographical position of each animal present in the region of interest based on a location of a corresponding connection graph in the image.

4. The method of claim 1, further comprising:
    determining one or more postures of the one or more animals based on the one or more connection graphs.

5. The method of claim 4, further comprising:
    performing a behavior analysis on the one or more animals based on the one or more postures to generate an analysis result;
    performing a diagnosis on the one or more animals based on the analysis result to generate a diagnosis report; and
    providing a message that describes the analysis result, the diagnosis report, or a combination thereof.

6. The method of claim 1, wherein the group of key points comprises one or more of a head key point, a shoulder key point, an abdomen key point, a buttock key point, an elbow joint key point of a left front leg, a left front foot key point, an elbow joint key point of a right front leg, a right front foot key point, an elbow joint key point of a left back leg, a left back foot key point, an elbow joint key point of a right back leg, and a right back foot key point.

7. The method of claim 1, wherein the animal detection model is configured to generate the group of feature maps from the image using a series of depthwise separable convolutional blocks.

8. The method of claim 7, wherein the animal detection model comprises:
a feature extraction model configured to generate the group of feature maps from the image using the series of depthwise separable convolutional blocks,
wherein each depthwise separable convolutional block comprises an expansion layer, a depthwise convolution layer and a pointwise convolution layer that are applied in series, and
wherein each of the expansion layer, the depthwise convolution layer and the pointwise convolution layer is followed by a group normalization.

9. The method of claim 7,
wherein each of the first-stage neural network and the second-stage neural network comprises one or more convolutional blocks, with each convolutional block comprising a convolution layer followed by a group normalization and a parametric rectified linear unit (PReLU) activation function.

10. The method of claim 1, further comprising:
training the animal detection model using a plurality of training images that depict animals with a plurality of body shapes and postures in a plurality of living environments, wherein the plurality of training images are captured at a plurality of times with different illuminance.

11. The method of claim 10, further comprising:
for each animal captured in a training image,
labeling one or more key points of the animal at one or more locations of the training image; and
assigning a visibility attribute to each key point labeled at a corresponding location of the training image.

12. The method of claim 11, wherein each key point labeled in the training image is configured to have a two-dimensional Gaussian distribution, with a covariance of the Gaussian distribution being proportional to a minimal distance between the key point and one or more adjacent key points.

13. The method of claim 1, wherein determining the one or more connection graphs comprises:
generating a combined location map based on the group of probability maps, wherein the combined location map identifies one or more locations for each key point in the image;
determining a group of segment clusters for the group of key point sets based on the combined location map and the group of affinity field maps, wherein each segment cluster for a corresponding key point set comprises one or more instances of an animal segment associated with the key point set; and
classifying each instance of each animal segment in the group of segment clusters into the one or more connection graphs such that one or more instances of one or more animal segments belonging to a same animal are aggregated into a same connection graph.

14. The method of claim 13, wherein generating the combined location map based on the group of probability maps comprises:
for each key point, processing a probability map corresponding to the key point to generate a location map for the key point, so that a group of location maps are generated for the group of probability maps; and
combining the group of location maps to generate the combined location map.

15. The method of claim 13, wherein determining the group of segment clusters for the group of key point sets comprises:
for each key point set that comprises a first key point and a second key point, matching one or more first locations of the first key point to one or more second locations of the second key point to form a segment cluster for the key point set based on an affinity field map of the key point set, so that the group of segment clusters is generated for the group of key point sets.

16. The method of claim 15, wherein matching the one or more first locations of the first key point to the one or more second locations of the second key point to form the segment cluster comprises:
for each first location of the first key point,
measuring one or more degrees of association between the first location of the first key point and the one or more second locations of the second key point based on the affinity field map of the key point set;
determining a maximum degree of association from the one or more degrees of association;
determining whether the maximum degree of association satisfies an association threshold; and
responsive to the maximum degree of association satisfying the association threshold, forming an instance of the animal segment in the segment cluster by associating the first location of the first key point with a second location of the second key point that corresponds to the maximum degree of association, wherein the instance of the animal segment appears between the first location and the second location in the image.

17. A system for detecting animals in a region of interest, comprising:
a memory configured to store instructions; and
a processor coupled to the memory and configured to execute the instructions to perform a process comprising:
receiving an image that captures a scene in the region of interest;
feeding the image to an animal detection model to produce a group of probability maps for a group of key points and a group of affinity field maps for a group of key point sets, wherein the animal detection model comprises a two-stage detection model including a first-stage neural network and a second-stage neural network, the first-stage neural network is configured to produce the group of affinity field maps based on a group of feature maps generated from the image, and the second-stage neural network is configured to produce the group of probability maps based on the group of affinity field maps and the group of feature maps;
determining one or more connection graphs based on the group of probability maps and the group of affinity field maps, wherein each connection graph outlines a presence of an animal in the image; and
detecting one or more animals present in the region of interest based on the one or more connection graphs.

18. The system of claim 17, wherein the processor and the memory are implemented in an embedded integrated circuit (IC) of a system on chip (SoC).

19. The system of claim 17, wherein the processor and the memory are implemented in a cloud computing device.

20. A non-transitory computer-readable storage medium configured to store instructions which, in response to an execution by a processor, cause the processor to perform a process comprising:
receiving an image that captures a scene in the region of interest;

feeding the image to an animal detection model to produce a group of probability maps for a group of key points and a group of affinity field maps for a group of key point sets, wherein the animal detection model comprises a two-stage detection model including a first-stage neural network and a second-stage neural network, the first-stage neural network is configured to produce the group of affinity field maps based on a group of feature maps generated from the image, and the second-stage neural network is configured to produce the group of probability maps based on the group of affinity field maps and the group of feature maps;

determining one or more connection graphs based on the group of probability maps and the group of affinity field maps, wherein each connection graph outlines a presence of an animal in the image; and detecting one or more animals present in the region of interest based on the one or more connection graphs.

\* \* \* \* \*